US012641574B2

(12) United States Patent
Fu

(10) Patent No.: US 12,641,574 B2
(45) Date of Patent: May 26, 2026

(54) DATA COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 491 days.

(21) Appl. No.: 18/105,756

(22) Filed: Feb. 3, 2023

(65) Prior Publication Data

US 2023/0199726 A1     Jun. 22, 2023

Related U.S. Application Data

(63) Continuation of application No. PCT/CN2020/107548, filed on Aug. 6, 2020.

(51) Int. Cl.
*H04W 72/04*     (2023.01)
*H04L 1/1812*     (2023.01)
*H04W 16/14*     (2009.01)

(52) U.S. Cl.
CPC ........... *H04W 72/04* (2013.01); *H04L 1/1812* (2013.01); *H04W 16/14* (2013.01)

(58) Field of Classification Search
CPC ..... H04W 72/04; H04W 16/14; H04W 72/51;

H04W 72/54; H04W 74/0808; H04W 72/115; H04W 72/23; H04L 1/1812; H04L 1/1822; H04L 1/1864; H04L 1/188; H04L 1/1893
See application file for complete search history.

(56) References Cited

U.S. PATENT DOCUMENTS

| | | | | |
|---|---|---|---|---|
| 2018/0352556 | A1 | 12/2018 | Loehr et al. | |
| 2019/0357264 | A1 | 11/2019 | Yi et al. | |
| 2020/0275475 | A1* | 8/2020 | Bhattad ..................... | H04L 1/18 |
| 2020/0314842 | A1* | 10/2020 | Bhattad ................. | H04L 1/1893 |
| 2021/0160011 | A1* | 5/2021 | Bang ..................... | H04L 1/1812 |
| 2022/0217749 | A1* | 7/2022 | Yu .......................... | H04W 72/20 |
| 2022/0217763 | A1* | 7/2022 | Oviedo ................. | H04W 72/23 |
| 2022/0393794 | A1* | 12/2022 | Wang ..................... | H04L 1/188 |

(Continued)

FOREIGN PATENT DOCUMENTS

| | | |
|---|---|---|
| CN | 110536393 A | 12/2019 |
| CN | 110557835 A | 12/2019 |

(Continued)

OTHER PUBLICATIONS

On Configured Grant Enhancements for NR URLLC, R1-1903502, 3GPP, 2019 (Year: 2019).*

(Continued)

*Primary Examiner* — Habte Mered
(74) *Attorney, Agent, or Firm* — BAYES PLLC

(57)     ABSTRACT

The embodiments of the present disclosure provide a data communication method, a terminal device and a network device. The method includes: according to Configured Grant (CG) resource configuration information, determining, by a terminal device, a CG resource usage mode. The CG resource configuration information is sent by a network device.

14 Claims, 5 Drawing Sheets

(56) References Cited

U.S. PATENT DOCUMENTS

| | | | | |
|---|---|---|---|---|
| 2023/0143675 A1* | 5/2023 | Li | ...................... | H04W 72/1268 |
| | | | | 370/329 |
| 2023/0171802 A1* | 6/2023 | Nunome | ........... | H04W 74/0808 |
| | | | | 370/329 |
| 2023/0198680 A1* | 6/2023 | Ganesan | ............... | H04L 1/0026 |
| | | | | 370/328 |
| 2023/0199749 A1* | 6/2023 | Gerami | ................. | H04W 72/21 |
| | | | | 370/329 |
| 2023/0337225 A1* | 10/2023 | Alfarhan | ........... | H04W 72/1268 |
| 2023/0345433 A1* | 10/2023 | Bhattad | ................. | H04L 1/1864 |

FOREIGN PATENT DOCUMENTS

| | | | |
|---|---|---|---|
| CN | 110622545 A | 12/2019 | |
| CN | 111356172 A | 6/2020 | |
| CN | 111385070 A | 7/2020 | |
| EP | 3614758 A1 | 2/2020 | |
| WO | 2020125573 A1 | 6/2020 | |

OTHER PUBLICATIONS

International Search Report issued in International application No. PCT/CN2020/107548, mailed Apr. 26, 2021.
Written Opinion of the International Searching Authority issued in International application No. PCT/CN2020/107548, mailed Apr. 26, 2021.
3GPP TR 38.889 V16.0.0 (Dec. 2018); Technical Specification Group Radio Access Network; Study on NR-based access to unlicensed spectrum (Release 16).
Ericsson et al., "Corrections of NR operating with shared spectrum channel access in 38.321", R2-2005853, 3GPP TSG-RAN2 #110_e Electronic meeting, Jun. 1 to 12, 2020.
OPPO, "Considerations on configured grant for NR-U", R1-1812804, 3GPP TSG RAN WG1 Meeting #95 Spokane, USA, Nov. 12-16, 2018.
Qualcomm Inc., "New WID on NR-based Access to Unlicensed Spectrum", RP-182878, 3GPP TSG RAN Meeting #82 Sorrento, Italy, Dec. 10-13, 2018.
Communication pursuant to Article 94(3) EPC issued in corresponding European Application No. 20948710.7, mailed Dec. 20, 2024. 7 pages.
Notice of Priority Examination of Patent Application issued in corresponding Chinese Application No. 202310811287.5, mailed on Jul. 31, 2024, 6 pages.
First Office Opinion Notice issued in corresponding Chinese Application No. 202310811287.5, mailed on Aug. 19, 2024, 16 pages.
"Discussion on both CG timer and CG retx timer in NR-U", Agenda Item : 11.2.1.2 MAC, Source : LG Electronics Inc., 3GPP TSG-RAN WG2 Meeting #106, R2-1907871, Reno, USA, May 13-17, 2019.
Extended European Search Report issued in corresponding European application No. 20948710.7, mailed Jul. 20, 2023.
3GPP TSG RAN WG1 Meeting #96 Athens, Greece, Feb. 25-Mar. 1, 2019; R1-1903502; Source: Nokia, Nokia Shanghai Bell; Title: On Configured Grant enhancements for NR URLLC.
3GPP TSG RAN WG1 #97 Reno, USA, May 13-17, 2019; R1-1906152; Source: vivo; Title: On resources conflict between configured grant and dynamic grant PUSCH.

* cited by examiner

DATA COMMUNICATION METHOD, TERMINAL DEVICE AND NETWORK DEVICE

CROSS-REFERENCE TO RELATED APPLICATION

This application is a continuation of International Application No. PCT/CN2020/107548, filed on Aug. 6, 2020, the content of which is incorporated herein by reference in its entirety.

TECHNICAL FIELD

Embodiments of the present disclosure generally relate to the communication technical field, and more specifically, to a data communication method, a terminal device and a network device.

BACKGROUND

How R17 supports Ultra-Reliable and Low Latency Communications (URLLC) service transmissions or uses Configured Grant (CG) resource(s) in New Radio Unlicensed (NRU) interference controlled scenarios, interference uncontrolled scenarios, or interference partially-controlled scenarios is undetermined.

SUMMARY

Embodiments of the present disclosure provide a data communication method, a terminal device and a network device, in which the terminal device determines at least one of a CG resource usage mode, a CG resource configuration mode or a CG resource configuration parameter according to a first environment and/or CG resource configuration information, so as to improve the definition and transmission of CG resources.

According to a first aspect, an embodiment of the present disclosure provides a data communication method. The method may include:

according to a first environment and/or Configured Grant (CG) resource configuration information, determining, by a terminal device, at least one of a CG resource usage mode, a CG resource configuration mode or a CG resource configuration parameter, wherein the first environment is determined by the terminal device according to first environment indication information sent by a network device, and the CG resource configuration information is sent by the network device.

According to a first aspect, an embodiment of the present disclosure provides a data communication method. The method may include:

sending, by a network device, first environment indication information and/or Configured Grant (CG) resource configuration information to a terminal device, wherein the first environment indication information is used for the terminal device to determine a corresponding first environment, and the first environment and/or the CG resource configuration information is used for the terminal device to determine at least one of a CG resource usage mode, a CG resource configuration mode or a CG resource configuration parameter.

According to another aspect, an embodiment of the present disclosure provides a terminal device. The terminal device has a function of: according to a first environment and/or Configured Grant (CG) resource configuration information, determining at least one of a CG resource usage mode, a CG resource configuration mode or a CG resource configuration parameter. The function may be implemented by hardware, or may be implemented by execution of corresponding software by hardware. The hardware or software includes one or more modules corresponding to the above function(s).

According to another aspect, an embodiment of the present disclosure provides a network device. The terminal device has a function of: according to a first environment and/or Configured Grant (CG) resource configuration information, determining at least one of a CG resource usage mode, a CG resource configuration mode or a CG resource configuration parameter. The function may be implemented by hardware, or may be implemented by execution of corresponding software by hardware. The hardware or software includes one or more modules corresponding to the above function(s).

According to another aspect, an embodiment of the present disclosure provides a terminal device. The terminal device includes: a memory storing executable program codes; and a processor coupled with the memory. The processor is configured to perform the method in the first aspect of embodiment of the present disclosure.

According to another aspect, an embodiment of the present disclosure provides a network device. The terminal device includes: a memory storing executable program codes; and a processor coupled with the memory. The processor is configured to perform the method in the second aspect of embodiment of the present disclosure.

According to another aspect, an embodiment of the present disclosure provides a computer-readable storage medium including instructions, which when running on a computer, cause the computer to perform the method in the first or second aspect of the present disclosure.

According to another aspect, an embodiment of the present disclosure provides a computer program product including instructions, which when running on a computer, cause the computer to perform the method in the first or second aspect of the present disclosure.

According to another aspect, an embodiment of the present disclosure provides a chip. The chip is coupled with the memory in the terminal device, so that when the chip runs, the program instructions stored in the memory are call to cause the terminal device to perform the method in the first aspect of the present disclosure.

According to another aspect, an embodiment of the present disclosure provides a chip. The chip is coupled with the memory in the network device, so that when the chip runs, the program instructions stored in the memory are call to cause the network device to perform the method in the second aspect of the present disclosure.

In technical solutions provided by embodiments of the present disclosure, the terminal device determines at least one of a CG resource usage mode, a CG resource configuration mode or a CG resource configuration parameter according to a first environment and/or CG resource configuration information. The first environment is determined by the terminal device according to first environment indication information sent by a network device, and the CG resource configuration information is sent by the network device. In this way, related definition and transmission of CG resources in the system are improved.

DETAILED DESCRIPTION

Figure 1:
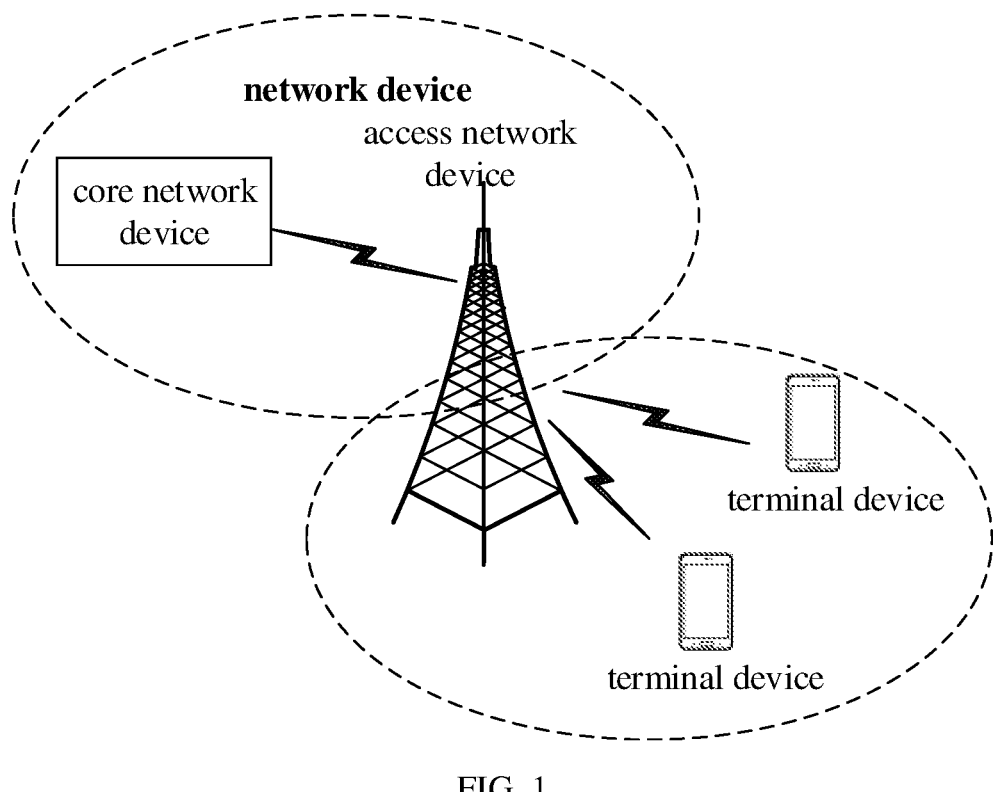
FIG. 1 is a diagram of a system architecture of a communication system which embodiments of the present disclosure may be applied.

The technical solutions in the embodiments of present disclosure will be described below in conjunction with the accompanying drawings in the embodiments of present disclosure. It is clear that the embodiments described herein are merely a part of the embodiments of present disclosure and not all of them. Based on the embodiments described herein, all other embodiments obtained by a person of ordinary skill in the art without making creative labor should fall within the scope of protection of present disclosure.

The following briefly describes some terms involved in embodiments of the present disclosure.

1. URLLC Related Background

In the URLLC for 5G Access Network 2 (5G RAN2 URLLC), it is specified that services such as Factory automation, Transport Industry, and Electrical Power Distribution need to be supported in the transmissions of the 5G system. CG enhancements are provided to support the transmission of URLLC services, i.e., multiple CG configurations are introduced, and the specific configuration and use of CG (e.g., support for slot-level period, support for autonomous transmission on CG, etc.) are enhanced. Rel-17 needs to consider supporting URLLC services in interference-controlled NRU scenarios. Specifically, the use of NRU CG and ULRRC CG enhancements in NRU scenarios may be considered, i.e., by harmonizing UL configured-grant enhancements in NRU and URLLC introduced in Rel-16 to be applicable for unlicensed spectrum.

2. CG Enhancements in URLLC

In order to support the high latency requirements of URLLC services, the CG period is enhanced in URLLC to support any slot-level service period.

In order to support multiple URLLC services and the high latency requirements of URLLC services, URLLC introduces multiple CGs. Different CGs are configured with different Hybrid Automatic Repeat Request (HARQ) processes, and a harq-ProcID-Offset2 is used to guarantee that processes for different CGs are different.

Due to the existence of conflicts between CG resources and other resources, autonomous transmission for CG is introduced in order to ensure that packetized Medium Access Control Protocol Data Units (MAC PDUs) (i.e., deprioritized MAC PDUs) in the CG resources are not discarded/transmitted as soon as possible. For CG for which MAC PDUs are already packetized and cannot be transmitted due to a resource conflict, a new transmission may be performed using a subsequent CG resource that is with a same HARQ process and belongs to same CG configuration. The use of autonomous transmission is determined by autonomousTx.

3. NRU Related Background

NR may work in the unlicensed band. The following working scenarios may be included.

Scenario A: in a carrier aggregation scenario, a primary cell (PCell) works on the licensed spectrum, and a secondary cell (SCell) aggregately works on the unlicensed spectrum by carrier aggregation.

Scenario B: in a dual connection working scenario, the PCell may be LTE licensed spectrum, and the PScell may be NR un licensed spectrum.

Scenario C: in a standalone working scenario, the NR works as an independent cell in the unlicensed spectrum.

Scenario D: in a NR single-cell scenario, the uplink (UL) transmission works in the licensed spectrum and the downlink (DL) transmission works in the unlicensed spectrum.

Scenario E: in dual connection operation scenario, the PCell may be NR licensed spectrum, and the PScell is NR unlicensed spectrum.

In general, the working band of NRU is 5 GHz unlicensed spectrum and 6 GHz unlicensed spectrum. In the unlicensed spectrum, NRU should be designed to ensure fairness with other systems already working on these unlicensed spectrums, such as Wireless Fidelity (WiFi), etc. The principle of fairness is that NRU cannot have more influence on systems already deployed on the unlicensed spectrums (such as WiFi) than an influence between these systems.

To ensure fair coexistence among systems on the unlicensed spectrum, energy detection has been agreed as a basic coexistence mechanism. The general energy detection mechanism is the Listen Before Talk (LBT) mechanism. The basic principle of the mechanism is that: before transmitting data on the unlicensed spectrum, a base station or a terminal (a transmitting end) needs to listen for a period of time as required. If the listening result indicates that the channel is idle, the transmitting end can transmit data to a receiving end. If the listening result indicates that the channel is occupied, the transmitting end needs to back off for a period of time as required and continue listening to the channel until the channel listening result is idle, then the transmitting end can transmit data to the receiving end.

Four channel access categories are specified in NRU (see TR 38.889).

Category 1: Immediate Transmission Category

The category is that a TX side may quickly transmit after a switching gap inside a Channel Occupancy Time (COT). The switching gap is the turnaround time from reception to transmission, and the typical value is no more than 16 us.

Category 2: LBT Scheme without Random Back-Off

This scheme means that the duration of time that the channel is sensed by the UE is deterministic and is typically relatively short, e.g., 25 us.

Category 3: LBT Scheme with Random Back-Off (with a Contention Window of Fixed Size)

In the LBT procedure, the transmitting side randomly takes a random value in the contention window to determine the time to listen to the channel.

Category 4: LBT Scheme with Random Back-Off (with a Contention Window of Variable Size)

In the LBT procedure, the transmitting side randomly takes a random value in the contention window to decide the time to listen to the channel, and the contention window is variable.

In summary, for the terminal device, the base station needs to transmit data to the terminal device within the maximum channel occupancy time (MCOT). If the base station does not preempt a channel, that is, outside the MCOT time, the terminal device cannot receive the scheduling data sent by the base station to the terminal device.

4. Uplink LBT Failure in NRU

The uplink transmission initiated by User Equipment (UE) includes mainly the following categories.

Scheduling request (SR): used to request an uplink resource;

Physical Random Access Channel (PRACH) transmission: this is triggered by Random Access Channel (RACH), and the UE needs to send msg1;

Physical Uplink Shared Channel (PUSCH) transmission: including uplink data transmission based on configured grant and uplink data transmission based on dynamic grant;

Physical layer signaling transmission: including acknowledgement (ACK) and/or negative acknowledgement (ACK/NACK) feedback, Channel Status Indicator (CSI) report, etc.

In the unlicensed band, the UE needs to listen to a channel with LBT to see if the channel is available before the UE transmits SR, PRACH or PUSCH, etc. If the channel is not available, i.e., LBT fails, the UE needs to wait until a next transmission opportunity to perform LBT again. If LBT failure is detected, the MAC layer needs to be notified of the LBT failure information.

5. CG Enhancements in NRU

To flexibly select resources, the HARQ processes for NRU CGs are not calculated according to a formula, but is selected by the UE itself. For one CG resource, the Radio Resource Control (RRC) configures a HARQ process set, and the UE may select one HARQ process in the set for this CG transmission. The configured HARQ process interval is determined by the harq-ProcID-Offset and the nrof HARQ-Processes.

In order to support back-to-back resource configuration, multiple CGs are introduced in NRU, where multiple CG configurations may share a HARQ process.

A CG retransmission timer (cg-Retransmission Timer) is introduced in order to support autonomous resource retransmission when CG resources cannot be transmitted due to LBT failure. After the cg-Retransmission Timer expires, if the Configured Grant Timer does not expire, retransmission may be performed for a corresponding HARQ process.

CG transmission may be interrupted by dynamically scheduled Downlink Control Information (DCI) and Downlink Feedback Information (DFI). The specific actions are as shown in Table 1:

TABLE 1

|  | DFI = ACK | DFI = NACK | DCI = new tx | DCI = retx | CG timer expires |
|---|---|---|---|---|---|
| CG timer | Stop | No impact | Start/Restart | Start/Restart | None |
| CG retx timer | Stop | Stop | Stop | stop | Stop |

How R17 supports URLLC service transmission or uses CG resources in NRU interference controlled scenarios, interference uncontrolled scenarios, or interference partially-controlled scenarios is undetermined.

FIG. 1 is a system architecture diagram of a communication system in which embodiments of the present disclosure may be applied. The communication system may include a network device, and the network device may be a device that communicates with a terminal device (or referred to as a communication terminal, a terminal). The network device may provide communication coverage for a specific geographic area and may communicate with terminal devices located within that coverage area. FIG. 1 illustrates exemplarily a network device and two terminal devices. Optionally, the communication system may include multiple network devices and each network device may include other numbers of terminal devices within the coverage area of each network device, and embodiments of the present disclosure do not impose specific limitations on this. Optionally, the communication system may further include other network entities such as a network controller, a mobile management entity, etc., and embodiments of the present disclosure do not impose specific limitations on this.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may include a access network device and a core network device. That is, the wireless communication system further includes multiple core networks for communication with an access network device. The access network device may be a base station (evolutional node B, or eNB or e-NodeB for short), a macro base station, a micro base station (also called "small base station"), a pico base station, an access point (AP), a transmission point (TP) or a new generation base station (new generation Node B, gNodeB) and so on in a Long-Term Evolution (LTE) system, or a next generation mobile communication (next radio, NR) system or authorized auxiliary access long-term evolution (LAA-LTE LTE) system.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, a or balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that a device having a communication function in the network/system in embodiments of the present disclosure may be referred to as a communication device. Taking the communication system shown in FIG. 1 as an example, the communication device may include a network device and terminal devices with a communication function, and the network device and the terminal devices may be the specific devices described in the above embodiments, which will not be repeated here. The communication device may further include other devices in the communication system, such as other network entities like a network controller or a mobility management entity, which are not limited in embodiments of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

The communication systems in embodiments of the present disclosure may be applied to a Carrier Aggregation (CA) scenario, or may be applied to a Dual Connectivity (DC) scenario, or may be applied to a standalone (SA) network deployment scenario.

Figure 2:
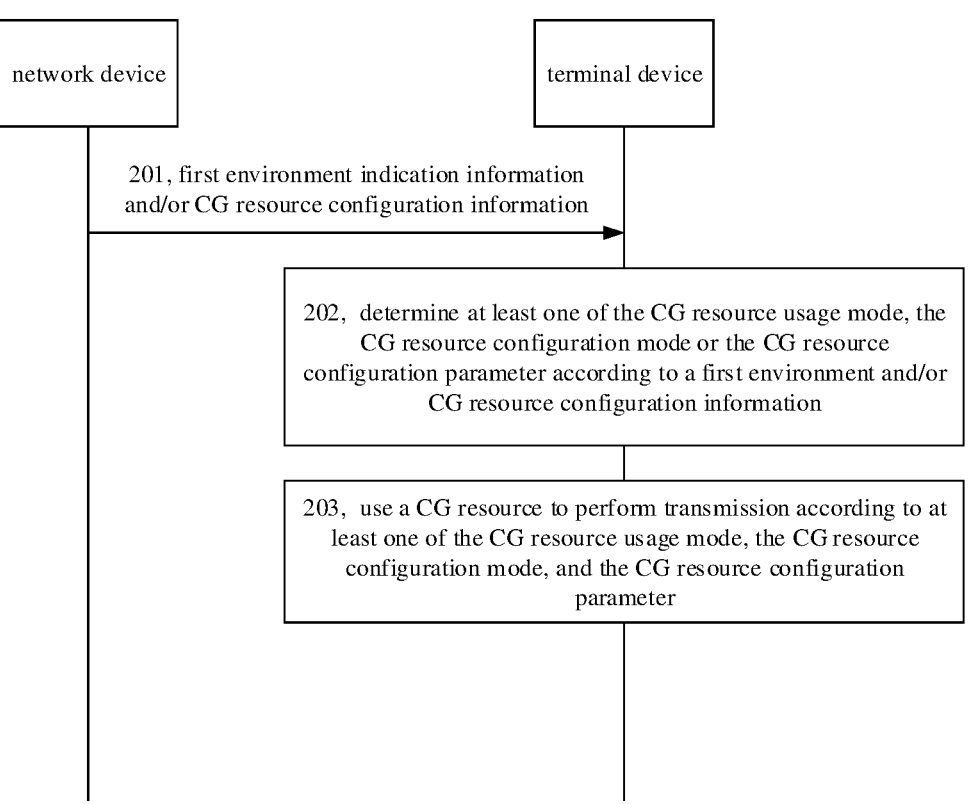
FIG. 2 is a schematic diagram of a data communication method according to an embodiment of the present disclosure.

The technical solutions of the present disclosure will be further described below using embodiments. FIG. 2 is a schematic diagram of a data communication method according to an embodiment of the present disclosure. The method may include the following steps:

In 201, a network device sends first environment indication information and/or CG resource configuration information to the terminal device.

Optionally, the CG resource configuration information may include: one or multiple pieces of CG resource configuration information.

Optionally, the CG resource configuration information may include at least one of: indication information for a CG resource usage mode; indication information for a CG resource configuration mode; or, the CG resource configuration parameter.

Optionally, the indication information of the CG resource usage mode may include: indication information for a CG resource usage mode corresponding to URLLC; or, indication information for a CG resource usage mode corresponding to NRU.

It is noted that a CG resource corresponding to the URLLC may be understood as a CG resource corresponding to at least one of a CG resource usage mode, a CG resource configuration parameter and a CG resource configuration mode configured for transmitting a URLLC service in the NR system. Optionally, the above may be at least one of a parameter configuration mode, a resource configuration mode, and a resource usage mode for the R16 NR system.

ACG resource corresponding to the NRU may be understood as a CG resource corresponding to at least one of a CG resource usage mode, a CG resource configuration parameter and a CG resource configuration mode configured for transmitting an uplink service in the NRU system. Optionally, the above may be at least one of a parameter configuration mode, a resource configuration mode, and a resource usage mode for the R16 NRU system. Optionally, the uplink service may be the URLLC service.

It is noted that the URLLC service may also be other ultra-reliable and low-latency services, such as V2X services, or time-sensitive network services.

Optionally, the indication information for the CG resource usage mode or configuration mode corresponding to the URLLC may include: indication information for the CG resource usage mode or configuration mode corresponding to legacy URLLC; or, indication information for the CG resource usage mode or configuration mode corresponding to enhanced URLLC.

The indication information for the CG resource usage mode or configuration mode corresponding to the NRU may include: indication information for the CG resource usage mode or configuration mode corresponding to legacy NRU; or, indication information for the CG resource usage mode or configuration mode corresponding to enhanced NRU.

Optionally, the CG resource parameter configuration mode corresponding to the URLLC may include: a CG resource parameter configuration mode corresponding to legacy URLLC (e.g., including a particular parameter); or, a CG resource parameter configuration mode corresponding to enhanced URLLC (e.g., including a particular parameter).

A CG resource parameter configuration mode corresponding to NRU may include: a CG resource parameter configuration mode corresponding to legacy NRU (e.g., including a particular parameter); or, a CG resource parameter configuration mode corresponding to enhanced NRU (e.g., including a particular parameter).

In 202, according to a first environment and/or CG resource configuration information, the terminal device determines at least one of the CG resource usage mode, the CG resource configuration mode or the CG resource configuration parameter. The first environment is determined by the terminal device according to first environment indication information sent by the network device. The CG resource configuration information is sent by the network device.

Optionally, the CG resource usage or configuration mode may include: a CG resource usage or configuration mode corresponding to URLLC; or, a CG resource usage or configuration mode corresponding to NRU.

Optionally, the CG resource usage or configuration mode corresponding to the URLLC may include: a CG resource usage or configuration mode corresponding to the legacy URLLC, or, an enhanced CG resource usage or configuration mode corresponding to the enhanced URLLC.

The CG resource usage or configuration mode corresponding to the NRU may include: a CG resource usage or configuration mode corresponding to the legacy NRU; or, an enhanced CG resource usage or configuration mode corresponding to the enhanced NRU.

Optionally, the CG resource configuration parameter may include: a CG resource configuration parameter corresponding to the URLLC; or, a CG resource configuration parameter corresponding to the NRU.

Optionally, the CG resource configuration parameter corresponding to the URLLC may include: a CG resource configuration parameter corresponding to the legacy URLLC; or, a CG resource configuration parameter corresponding to the enhanced URLLC.

The CG resource configuration parameter corresponding to the NRU may include: a CG resource configuration parameter corresponding to the legacy NRU; or, a CG resource configuration parameter corresponding to the enhanced NRU.

Optionally, when the first environment is different, a corresponding CG resource usage mode or configuration mode or configuration parameter is different.

In 203, the terminal device uses a CG resource to perform transmission according to at least one of the CG resource usage mode, the CG resource configuration mode, and the CG resource configuration parameter.

That is, the terminal device uses the CG resource to perform transmission according to the CG resource usage mode; and/or, the terminal device uses the CG resource to perform transmission according to the CG resource configuration mode; and/or, the terminal device uses the CG resource to perform transmission according to the CG resource configuration parameter.

Optionally, the method further may further include at least one of the following:

(1) the CG resource configuration information including configuration information of a timer;

(2) starting or not starting the timer by the terminal device;

(3) obtaining, by the terminal device, a Hybrid Automatic Repeat Request (HARQ) process using a HARQ process formula calculation, or using a UE determination or self-selection method;

(4) performing, by the terminal device, autonomous transmission corresponding to URLLC or autonomous retransmission corresponding to NRU for the HARQ process, or for deprioritized Media Access Control Protocol Data Unit (MAC PDU)/a deprioritized resource;

(5) when performing transmission or autonomous transmission for the HARQ process, or for the deprioritized MAC PDU/the deprioritized resource, not setting or modifying a pending state of the HARQ process and/or not restarting or starting the timer by the terminal device;

(6) setting the deprioritized MAC PDU/the deprioritized resource or the HARQ process to be a pending state; as an example, when the terminal device performs transmission or autonomous retransmission, setting the deprioritized MAC PDU/the deprioritized resource or the HARQ process to be a pending state;

(7) transmitting, by the terminal device, the deprioritized MAC PDU/the deprioritized resource or the HARQ process in the pending state, and starting or not starting the timer; as an example, when the terminal device performs transmission or autonomous transmission or autonomous retransmission, starting or not starting the timer for the deprioritized MAC PDU/the deprioritized resource or the HARQ process in the pending state;

(8) autonomously transmitting, by the terminal device, data of the HARQ process;

(9) the terminal device being configured with an offset of the HARQ process;

(10) the terminal device being configured with an offset2 of the HARQ process;

(11) when the terminal device transmits the CG resource or transmits data of the HARQ process, not carrying Uplink Control Information (UCI) by the terminal device;

(12) when performing transmission for the HARQ process, carrying the UCI by the terminal device, wherein the UCI including at least the HARQ process;

(13) not receiving or expecting to receive Downlink Feedback Information (DFI) by the terminal device;

(14) receiving, by the terminal device, the DFI, and ignoring the DFI;

(15) receiving, by the terminal device, the DFI, and performing a corresponding operation in accordance with the DFI;

(16) supporting or using, by the terminal device, a transmission mode across a slot boundary, which may be indicated by dedicated configuration information sent by the network device, e.g., a CG resource configuration parameter, or a PUSCH resource configuration parameter, or a separately sent indication information; as an example, by a particular parameter such as a parameter in PUSCH configuration (e.g., whether typeB is configured) may be used to determine whether to across a slot boundary;

(17) using, by the terminal device, a Type-B PUSCH resource configuration or transmission mode;

(18) packetizing, by the terminal device, MAC PDUs for each resource in conflict;

(19) indicating each of the packetized MAC PDUs to a physical layer; and

(20) indicating a triggered Scheduling Request (SR) and the packetized MAC PDUs to the physical layer.

Optionally, offsets of HARQ processes for different CG resources are the same or different, and/or, offset2s of the HARQ processes are different.

The following describes the CG resource(s) corresponding to URLLC and the CG resource(s) corresponding to NRU, respectively.

I. CG Resource(s) Corresponding to URLLC

Implementation 1: A CG Resource Usage Mode or Configuration Mode Corresponding to the Legacy URLLC Optionally, the method may further include at least one of the following:

the CG resource configuration information not including configuration information of a first timer;

not starting or not maintaining the first timer by the terminal device;

obtaining, by the terminal device, a first HARQ process using a HARQ process formula calculation;

performing, by the terminal device, autonomous transmission for the first HARQ process, or performing autonomous transmission for the first HARQ process using a first transmission mechanism; exemplarily, for autonomous retransmission, transmission is performed using autonomousTX; in a case where the first environment is a controlled environment, there is no need to consider LBT failure because the interference is controlled, and there is no pending resulted from LBT failure; if downlink LBT failure results in that DCI/DFI cannot be sent, CG retx timer is used to trigger retransmission, and so on;

the terminal device being configured with the offset2 of the first HARQ process; optionally, the offset2s of the HARQ processes are different between different CG resources;

when the terminal device transmits a CG resource or transmits data of the first HARQ process, not carrying a first UCI;

supporting or using, by the terminal device, a transmission mode across a slot boundary; exemplarily, a transmission across slot-boundary needs to be supported because the allocated resources are split or insufficient to support the required number of transmissions.

Optionally, the method may further include at least one of the following:

not receiving or not expecting to receive a first DFI by the terminal device;

receiving the first DFI by the terminal device, and ignoring the first DFI;

receiving the first DFI by the terminal device, and performing a corresponding operation according to the first DFI;

packetizing, by the terminal device, MAC PDUs for each resource in conflict;

indicating the packetized MAC PDUs to a physical layer; and indicating a triggered SR and the packetized MAC PDUs to the physical layer.

Implementation 2: A Enhanced CG Resource Usage Mode or Configuration Mode Corresponding to the Enhanced URLLC Optionally, the method may further include at least one of the following:

the CG resource configuration information not including configuration information of a second timer;

not starting or not maintaining the second timer by the terminal device;

obtaining, by the terminal device, a second HARQ process using a UE determination or self-selection mode; as an example, the HARQ process for a CG location in a target CG configuration may be selected by the UE itself;

performing, by the terminal device, autonomous transmission for the second HARQ process, or performing autonomous retransmission for the second HARQ process using a second transmission mechanism; as an example, CG resource(s) for transmission of the second HARQ process has(have) a same identity, or CG resource(s) for transmission of the second HARQ process has(have) different identities, or CG resource(s) for transmission of the second HARQ process has (have) different identities and same Transport Block Size (TBS); that is, a same CG resource or different CG resources may be used to perform autonomous retransmission for the second HARQ process; optionally, the CG resource(s) may be CG resource(s) correspond to URLLC, or may be CG resource(s) correspond to NRU;

Exemplarily, autonomous retransmission may be performed using autonomousTX transmission, and UE may use any CG location to perform transmission, as long as this HARQ process is selected at this location. If different CG HARQ processes may share a HARQ process, other CG(s) may also be used. Optionally, the other CG(s) needs(need) to have the same TBS (either auto resource selection or gNB configuration may be used to perform selection). In the case where the first environment is a controlled environment, there is no need to consider LBT failure because interference is controlled, and there is no pending resulted from LBT failure, if downlink LBT failure results in that DCI/DFI cannot be sent, CG retx timer is used to trigger retransmission, and so on.

the terminal device being configured with the offset of the second HARQ process, or the terminal device being configured with the offset2 of the second HARQ process; optionally, the offsets of the HARQ processes are the same or different between different CG resources, and the offset2s of the HARQ processes are different between different CG resources; following NRU, because the process is selected by UE itself, a conflict in HARQ processes may be avoided slightly;

when the terminal device transmits a CG resource or transmits data of the second HARQ process, carrying a second UCI by the terminal device, wherein the second UCI includes at least the second HARQ process;

not receiving or not expecting to receive a second DFI by the terminal device;

receiving the second DFI by the terminal device, and ignoring the second DFI (i.e., not following the DFI);

receiving the second DFI by the terminal device, and performing a corresponding operation according to the second DFI (i.e., following the DFI);

supporting or using, by the terminal device, a transmission mode across a slot boundary; exemplarily, a transmission across slot-boundary needs to be supported because the allocated resources are split or insufficient to support the required number of transmissions;

packetizing, by the terminal device, MAC PDUs for each resource in conflict;

indicating the packetized MAC PDUs to a physical layer; and indicating a triggered SR and the packetized MAC PDUs to the physical layer.

Exemplarily, MAC PDUs are packetized for each resource in conflict, or the packetized MAC PDUs are indicated to the physical layer, or the packetized MAC PDUs and the triggered SR are both indicated to the physical layer (URLLC enhancement, but not necessarily required, and there is no interference when the first environment is a controlled environment).

II. CG Resources Corresponding to NRU

Implementation 3: A CG Resource Usage or Configuration Mode Corresponding to Legacy NRU 1) Uplink LBT Failure in NRU The uplink transmission initiated by User Equipment (UE) includes mainly the following categories.

Scheduling request (SR): used to request an uplink resource;

Physical Random Access Channel (PRACH) transmission: this is triggered by Random Access Channel (RACH), and the UE needs to send msg1;

Physical Uplink Shared Channel (PUSCH) transmission: including uplink data transmission based on configured grant and uplink data transmission based on dynamic grant;

Physical layer signaling transmission: including acknowledgement (ACK) and/or negative acknowledgement (ACK/NACK) feedback, Channel Status Indicator (CSI) report, etc.

In the unlicensed band, the UE needs to listen to a channel with LBT to see if the channel is available before the UE transmits SR, PRACH or PUSCH, etc. If the channel is not available, i.e., LBT fails, the UE needs to wait until a next transmission opportunity to perform LBT again. If LBT failure is detected, the MAC layer needs to be notified of the LBT failure information.

2) CG Enhancements in NRU

To flexibly select resources, the HARQ processes for NRU CGs are not calculated according to a formula, but is selected by the UE itself. For one CG resource, the Radio Resource Control (RRC) configures a HARQ process set, and the UE may select one HARQ process in the set for this CG transmission. The configured HARQ process interval is determined by the harq-ProcID-Offset and the nrof HARQ-Processes.

In order to support back-to-back resource configuration, multiple CGs are introduced in NRU, where multiple CG configurations may share a HARQ process.

A CG retransmission timer (cg-Retransmission Timer) is introduced in order to support autonomous resource retransmission when CG resources cannot be transmitted due to LBT failure. After the cg-Retransmission Timer expires, if the Configured Grant Timer does not expire, retransmission may be performed for a corresponding HARQ process.

CG transmission may be interrupted by dynamically scheduled Downlink Control Information (DCI) and Downlink Feedback Information (DFI). The specific actions are as shown in Table 1 above, and details will not be repeated here.

Implementation 4: A CG Resource Usage Mode or Configuration Mode Corresponding to the Enhanced NRU Optionally, the method may further include at least one of the following:

the CG resource configuration information including configuration information of a third timer, and/or including first indication which is used for indicating a NRU configuration or starting a NRU function;

not starting or not maintaining the third timer by the terminal device; exemplarily, the CG retx timer is configured but is not used; or the CG retx timer is not configured and the first indication is used to indicate a NRU configuration or to start a NRU functionality (if the first indication is configured, the UE self-selects a HARQ process, and HARQ processes for different CGs may be the same, etc.);

obtaining, by the terminal device, a third HARQ process using a UE determination or self-selection mode; as an example, the HARQ process for a CG location in a target CG configuration may be selected by the UE itself;

performing, by the terminal device, autonomous transmission/retransmission for the third HARQ process, or performing autonomous transmission/retransmission for the third HARQ process using a first transmission mechanism; exemplarily, autonomous retransmission may be performed using autonomousTX transmission (in the case where the first environment is a controlled environment, there is no need to consider LBT failure because interference is controlled, and there is no pending resulted from LBT failure, if downlink LBT failure results in that DCI/DFI cannot be sent, CG retx timer is used to trigger retransmission, and so on);

when performing transmission or autonomous transmission for the deprioritized MAC PDU/the deprioritized resource or for the third HARQ process, not setting or modifying a pending state of the third HARQ process and/or not restarting or starting the timer by the terminal device; exemplarily, when perform resource transmission, it is not needed to modify the pending state of the third HARQ process, and/or, the CG retx timer is not started;

the terminal device being configured with the offset of the third HARQ process, or the terminal device being configured with the offset2 of the third HARQ process; optionally, the offsets of the HARQ processes are the same or different between different CG resources, and the offset2s of the HARQ processes are different between different CG resources; following NRU, because the process is selected by UE itself, a conflict in HARQ processes may be avoided slightly;

when the terminal device transmits a CG resource or transmits data of the third HARQ process, carrying a third UCI by the terminal device, wherein the third UCI includes at least the third HARQ process;

not receiving or not expecting to receive a third DFI by the terminal device;

receiving the third DFI by the terminal device, and ignoring the third DFI (i.e., not following the DFI);

receiving the third DFI by the terminal device, and performing a corresponding operation according to the third DFI (i.e., following the DFI);

supporting or using, by the terminal device, a transmission mode across a slot boundary; exemplarily, a transmission across slot-boundary needs to be supported because the allocated resources are split or insufficient to support the required number of transmissions;

packetizing, by the terminal device, MAC PDUs for each resource in conflict;

indicating the packetized MAC PDUs to a physical layer; and indicating a triggered SR and the packetized MAC PDUs to the physical layer.

Exemplarily, MAC PDUs are packetized for each resource in conflict, or the packetized MAC PDUs are indicated to the physical layer, or the packetized MAC PDUs and the triggered SR are both indicated to the physical layer (URLLC is supported, but not necessarily required, and there is no interference when the first environment is a controlled environment).

Implementation 5: a CG resource usage mode or configuration mode corresponding to the enhanced NRU (supporting URLLC)

Optionally, the method may further include at least one of the following:

the CG resource configuration information including configuration information of a fourth timer, and/or including first indication which is used for indicating a NRU configuration or starting a NRU function;

not starting or not maintaining the fourth timer by the terminal device; exemplarily, the CG retx timer is configured but is not used; or the CG retx timer is not configured and the first indication is used to indicate a NRU configuration or to start a NRU functionality (if the first indication is configured, the UE self-selects a HARQ process, and HARQ processes for different CGs may be the same, etc.);

obtaining, by the terminal device, a fourth HARQ process using a UE determination or self-selection mode; as an example, the HARQ process for a CG location in a target CG configuration may be selected by the UE itself;

performing, by the terminal device, autonomous retransmission for the fourth HARQ process, or performing autonomous retransmission for the fourth HARQ process using a second transmission mechanism; exemplarily, for autonomous retransmission: NRU retransmission mode is used, and a pending state is involved for a deprioritized MAC PDU; on an available CG, transmission is performed for a pending HARQ process (in the case where the first environment is a controlled environment, there is no need to consider LBT failure because interference is controlled, and there is no pending resulted from LBT failure, if downlink LBT failure results in that DCI/DFI cannot be sent, CG retx timer is used to trigger retransmission, and so on);

setting by the terminal device, a pending state for the deprioritized MAC PDU/the deprioritized resource or for the HARQ process;

transmitting, by the terminal device, the deprioritized MAC PDU/the deprioritized resource or the HARQ process in the pending state, and starting or not starting the timer; exemplarily, when perform resource transmission, it is not needed to start the CG retx timer;

the terminal device being configured with the offset of the fourth HARQ process, or the terminal device being configured with the offset2 of the fourth HARQ process; optionally, the offsets of the HARQ processes are the same or different between different CG resources, and the offset2s of the HARQ processes are different between different CG resources; following NRU, because the process is selected by UE itself, a conflict in HARQ processes may be avoided slightly;

when the terminal device transmits a CG resource or transmits data of the fourth HARQ process, carrying a fourth UCI by the terminal device, wherein the fourth UCI includes at least the fourth HARQ process;

not receiving or not expecting to receive a fourth DFI by the terminal device;

receiving the fourth DFI by the terminal device, and ignoring the fourth DFI (i.e., not following the DFI);

receiving the fourth DFI by the terminal device, and performing a corresponding operation according to the fourth DFI (i.e., following the DFI);

supporting or using, by the terminal device, a transmission mode across a slot boundary; exemplarily, a transmission across slot-boundary needs to be supported because the allocated resources are split or insufficient to support the required number of transmissions;

Optionally, if LBT does not fail or there is no interference, the CG retx timer may not be maintained or started.

packetizing, by the terminal device, MAC PDUs for each resource in conflict;

indicating the packetized MAC PDUs to a physical layer; and indicating a triggered SR and the packetized MAC PDUs to the physical layer.

Exemplarily, MAC PDUs are packetized for each resource in conflict, or the packetized MAC PDUs are indicated to the physical layer, or the packetized MAC PDUs and the triggered SR are both indicated to the physical layer (URLLC is supported, but not necessarily required, and there is no interference when the first environment is a controlled environment).

Implementation 6: A CG Resource Usage Mode or Configuration Mode Corresponding to an Enhanced NRU (Supporting URLLC)

At least one of the following may be included:

the CG resource configuration information including configuration information of a fifth timer, and/or including first indication which is used for indicating a NRU configuration or starting a NRU function;

not starting or not maintaining the fifth timer by the terminal device; or starting or maintaining the fifth timer by the terminal device; exemplarily, the CG retx timer is configured but is not used; or the CG retx timer is not configured, or the CG retx timer is configured to be started or maintained, or the first indication is configured to indicate a NRU configuration or to start a NRU functionality (if the first indication is configured, the UE self-selects a HARQ process, and HARQ processes for different CGs may be the same, etc.);

obtaining, by the terminal device, a fifth HARQ process using a HARQ process formula calculation, or using a UE determination or self-selection mode; as an example, the HARQ process for a CG location in a target CG configuration may be selected by the UE itself;

performing, by the terminal device, autonomous retransmission for the fifth HARQ process, or performing autonomous retransmission for the fifth HARQ process using a second transmission mechanism; exemplarily, for autonomous retransmission: NRU retransmission mode is used, and a pending state is involved for a deprioritized MAC PDU; on an available CG, transmission is performed for a pending HARQ process;

setting by the terminal device, a pending state for the deprioritized MAC PDU/the deprioritized resource or for the HARQ process;

transmitting, by the terminal device, the deprioritized MAC PDU/the deprioritized resource or the HARQ process in the pending state, and starting or not starting the timer;

the terminal device being configured with the offset of the fifth HARQ process, or the terminal device being configured with the offset2 of the fifth HARQ process; optionally, the offsets of the HARQ processes are the same or different between different CG resources, and the offset2s of the HARQ processes are different between different CG resources; following NRU, because the process is selected by UE itself, a conflict in HARQ processes may be avoided slightly;

when the terminal device transmits a CG resource or transmits data of the fourth HARQ process, carrying a fifth UCI by the terminal device, wherein the fifth UCI includes at least the fifth HARQ process;

not receiving or not expecting to receive a fifth DFI by the terminal device;

receiving the fifth DFI by the terminal device, and ignoring the fifth DFI;

receiving the fifth DFI by the terminal device, and performing a corresponding operation according to the fifth DFI;

supporting or using, by the terminal device, a transmission mode across a slot boundary; exemplarily, a transmission across slot-boundary needs to be supported because the allocated resources are split or insufficient to support the required number of transmissions;

packetizing, by the terminal device, MAC PDUs for each resource in conflict;

indicating the packetized MAC PDUs to a physical layer; and indicating a triggered SR and the packetized MAC PDUs to the physical layer.

Exemplarily, MAC PDUs are packetized for each resource in conflict, or the packetized MAC PDUs are indicated to the physical layer, or the packetized MAC PDUs and the triggered SR are both indicated to the physical layer (URLLC is supported, and when the first environment is a uncontrolled environment, this is needed, because there is interference. The result of LBT will most likely come after the resource selection).

III. Configuring Different Modes for Different Services Implementation 7: The CG Resource Configuration Information Further Includes CG Resource Configuration Information Corresponding to at Least One Different Service.

Optionally, the CG resource configuration information corresponding to at least one different service includes: CG resource configuration information corresponding to at least one of: an enhanced Mobile Broadband (eMBB) service, a Vehicle to X (V2X) service, a Time-Sensitive Communication (TSC) service, a URLLC service, and a massive Machine Type of Communication (mMTC) service. Exemplarily, for the eMBB service, the legacy NRU mode is configured; for the URLLC service, the NRU enhanced mode in implementation 4 or 5 is configured.

IV. When the CG Resource Configuration Information Includes Multiple Pieces of CG Resource Configuration Information, the Method Further Includes One of the Following:

selecting, by the terminal device, first CG resource configuration information/CG resource usage mode according to at least one of the multiple pieces of CG resource configuration information, a current interference situation, and the first environment; or selecting, by the terminal device, the first CG resource configuration information/CG resource usage mode according to particular indication information sent by the network device.

Optionally, the first environment may be a controlled environment, a uncontrolled environment, or a partially-controlled environment.

Optionally, the method may further include: reporting, by the terminal device, to the network device the selected first CG resource configuration information/CG resource usage mode. Exemplarily, the network device configures multiple sets of modes, and the terminal device determines in real time which set of mode to use based on the interference situation. Optionally, the UE reports which set is selected by the base station.

Optionally, in implementations 1-5, the first environment may be a controlled environment, a partially-controlled environment, or, a time period without interference in the partially-controlled environment.

Optionally, in implementations 6 and 7, the first environment may be an uncontrolled environment, a partially-controlled environment, or, a time period in which there is interference in the partially-controlled environment.

Optionally, the network indicates, in real time or periodically, the selected first CG resource configuration information/CG resource usage mode.

Optionally, the UE selects/determines, in real time or periodically, the first CG resource configuration information/CG resource usage mode. Optionally, the UE reports the selected/determined first CG resource configuration information/CG resource usage mode to the network.

The embodiments of the present disclosure provide CG resource usage modes in a controlled environment, an uncontrolled environment and a partially-controlled environment in R17 or a communication system with higher communication level, in order to ensure the transmission requirements of URLLC services in NRU controlled scenario, uncontrolled scenario, and partially-controlled scenario.

Figures 3, 4A:
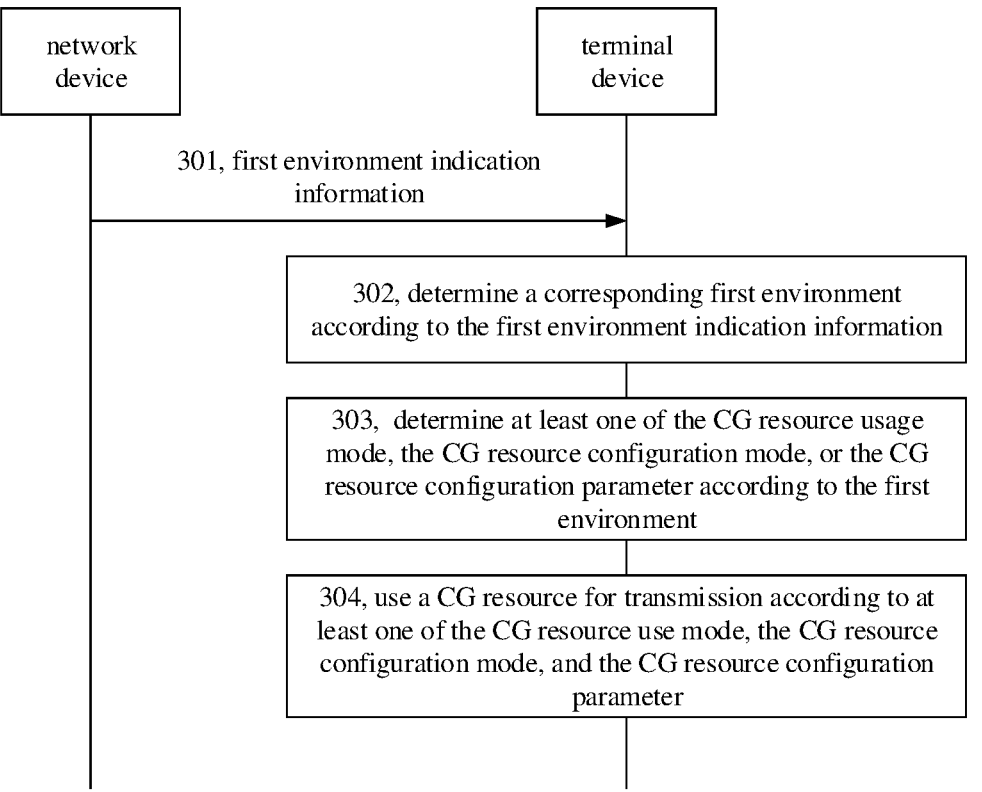
FIG. 3 is a schematic diagram of a data communication method according to another embodiment of the present disclosure.
FIG. 4A is a schematic diagram of a terminal device according to another embodiment of the present disclosure.

FIG. 3 is a schematic diagram of a data communication method according to another embodiment of the present disclosure. The method may include the following steps:

In 301, the terminal device receives the first environment indication information sent from the network device.

Optionally, the first environment is a controlled environment when the first environment indication information is indication information for the controlled environment; or the first environment is an uncontrolled environment when the first environment indication information is indication information for the uncontrolled environment.

Optionally, the first environment is a controlled environment when the first environment indication information is indication information for the controlled environment; or the first environment is an uncontrolled environment when the first environment indication information is indication information for the uncontrolled environment, or the first environment is a partially-controlled environment when the first environment indication information is indication information for the partially-controlled environment. It should be noted that in practical processes, when the terminal device receives the first environment indication information which is indication information for the partially-controlled environment, the terminal device may also determine the first environment as the partially-controlled environment, the controlled environment or the uncontrolled environment for processes.

It is understood that the first environment indication information is used to indicate whether the environment of the terminal device is a controlled environment or an uncontrolled environment or a partially-controlled environment. Here, the first environment may also be understood as a first scenario. Exemplarily, when the first environment indication information is true, it may indicate that the first environment is the controlled environment; when the first environment indication information is false, it may indicate that the first environment is the uncontrolled environment.

It should be noted that the controlled environment may be considered as an environment where there is low interference or there is no interference. The uncontrolled environment may be considered as an environment where there is high interference or there is interference. The partially-controlled environment may be considered as an environment where the terminal device is being interfered or there is partially interference. In the partially-controlled environment, there is LBT, sometimes LBT succeeds and sometimes LBT fails. For example, in the interference partially-controlled scenario, interference exists in some periods, or there is no interference in some periods.

Optionally, the first environment indication information includes condition information for determining the first environment, and the condition information for determining the first environment includes at least one of:

1) a mapping relationship between a time period and the first environment;
2) a correspondence relationship between Listen Before Talk (LBT) and the first environment;
3) a mapping relationship between detection of a Wireless Fidelity (WiFi) signal and the first environment;
4) a mapping relationship between a CG configuration and the first environment;
5) a mapping relationship between a CG resource configuration parameter and the first environment;
6) a mapping relationship between a channel quality and the first environment;
7) a mapping relationship between an interference level and the first environment;
8) a mapping relationship between an amount of interference and the first environment; and
9) a mapping relationship between a CG resource usage mode and the first environment.

Optionally, in a case where the first environment includes two levels: the controlled environment and the uncontrolled environment, the following examples are provided.

1) The mapping relationship between the time period and the first environment may include: a first time period corresponding to a controlled environment and a second time period corresponding to an uncontrolled environment. Exemplarily, the mapping relationship may indicate which period or periods the terminal device belongs to correspond to which environment.
2) The correspondence relationship between LBT and the first environment may include: a LBT success corresponding to the controlled environment and a LBT failure corresponding to the uncontrolled environment; or, a case where a number of LBT failures within a first preset duration less than a first preset threshold corresponding to the controlled environment, and a case where the number of LBT failures within the first preset duration greater than or equal to the first preset threshold corresponding to the uncontrolled environment; or a case where a number of LBT successes within a second preset duration greater than or equal to a second preset threshold corresponding to the controlled environment, and a case where the number of LBT successes within the second preset duration less than the second preset threshold corresponding to the uncontrolled environment.

It can be understood that the number of LBT failures or number of LBT successes may be number of consecutive or non-consecutive LBT failures or number of consecutive or non-consecutive LBT successes, and embodiments of the present disclosure do not impose specific limitations on this.

3) The mapping relationship between detection of the WiFi signal and the first environment may include: a case where no WiFi signal is detected corresponding to the controlled environment, and a case where the WiFi signal is detected corresponding to the uncontrolled environment.
4) The mapping relationship between a CG configuration and the first environment may include: one CG configuration corresponding to the controlled environment, and multiple CG configurations corresponding to the uncontrolled environment.
5) The mapping relationship between a CG resource configuration parameter and the first environment may include: inclusion of a particular CG resource configuration parameter corresponding to the controlled environment, and no inclusion of the particular CG resource configuration parameter corresponding to the uncontrolled environment; or no inclusion of the particular CG resource configuration parameter corresponding to the controlled environment, and inclusion of the particular CG resource configuration parameter corresponding to the uncontrolled environment.
6) The mapping relationship between the channel quality and the first environment may include: the channel quality greater than a first quality threshold corresponding to the controlled environment, and the channel quality less than or equal to the first quality threshold corresponding to the uncontrolled environment.
7) The mapping relationship between an interference level and the first environment may include: a low interference level corresponding to the controlled environment, and a high interference level corresponding to the uncontrolled environment.
8) The mapping relationship between an amount of interference and the first environment may include: an amount of interference less than a first interference threshold corresponding to the controlled environment, and an amount of interference greater than or equal to the first interference threshold corresponding to the uncontrolled environment.
9) The mapping relationship between a CG resource usage mode and the first environment may include: one CG resource usage mode corresponding to the controlled environment, and multiple CG resource usage modes corresponding to the uncontrolled environment; or, support for a particular CG usage mode corresponding to the controlled environment, and not support for the particular CG usage mode corresponding to the uncontrolled environment.

Optionally, the CG resource usage mode may include: a CG resource usage mode corresponding to the URLLC, or, a CG resource usage mode corresponding to the NRU.

Optionally, the CG resource usage mode corresponding to the URLLC may include: a CG resource usage mode corresponding to the legacy URLLC; or, an enhanced CG resource usage mode corresponding to the enhanced URLLC. The CG resource usage mode corresponding to NRU may include: a CG resource usage mode corresponding to legacy NRU; or, an enhanced CG resource usage mode corresponding to enhanced NRU.

Optionally, in a case where the first environment includes three levels: the controlled environment, the uncontrolled environment and the partially-controlled environment, the following examples are provided.

1) The mapping relationship between the time period and the first environment may include: a third time period corresponding to a controlled environment, a fourth time period corresponding to a partially-controlled environment and a fifth time period corresponding to an uncontrolled environment.

2) The correspondence relationship between LBT and the first environment may include:

a case where a number of LBT failures within a first preset duration less than a third preset threshold corresponding to the controlled environment, a case where the number of LBT failures within the first preset duration greater than or equal to the third preset threshold and less than a fourth preset threshold corresponding to the partially-controlled environment, and a case where the number of LBT failures within the first preset duration greater than or equal to the fourth preset threshold corresponding to the uncontrolled environment; or a case where a number of LBT successes within a second preset duration greater than or equal to a fifth preset threshold corresponding to the controlled environment, a case where the number of LBT successes within the second preset duration less than the fifth preset threshold and greater than or equal to a sixth preset threshold corresponding to the partially-controlled environment, and a case where the number of LBT successes within the second preset duration less than the sixth preset threshold corresponding to the uncontrolled environment.

3) The mapping relationship between detection of the WiFi signal and the first environment may include:

a case where no WiFi signal is detected in a first time period corresponding to the controlled environment, a case where no WiFi signal is detected in a part of the first time period and the WiFi signal is detected in another part of the first time period corresponding to the partially-controlled environment, and a case where the WiFi signal is detected in the first time period corresponding to the uncontrolled environment; or a case where no WiFi signal is detected in a first frequency band corresponding to the controlled environment, a case where no WiFi signal is detected in a part of the first frequency band and the WiFi signal is detected in another part of the first frequency band corresponding to the partially-controlled environment, and a case where the WiFi signal is detected in the first frequency band corresponding to the uncontrolled environment.

4) The mapping relationship between a CG configuration and the first environment may include: one CG configuration corresponding to the controlled environment, at least one of CG configurations corresponding to the partially-controlled environment, and multiple CG configurations corresponding to the uncontrolled environment.

5) The mapping relationship between the channel quality and the first environment may include: the channel quality greater than a second quality threshold corresponding to the controlled environment, the channel quality less than or equal to the second quality threshold and greater than a third quality threshold corresponding to the partially-controlled environment, and the channel quality less than or equal to the third quality threshold corresponding to the uncontrolled environment.

6) The mapping relationship between an interference level and the first environment may include: a low interference level corresponding to the controlled environment, a middle interference level corresponding to the partially-controlled environment, and a high interference level corresponding to the uncontrolled environment.

7) The mapping relationship between an amount of interference and the first environment may include: an amount of interference less than a second interference threshold corresponding to the controlled environment, an amount of interference greater than or equal to the second interference threshold and less than a third interference threshold corresponding to the partially-controlled environment, and an amount of interference greater than or equal to the third interference threshold corresponding to the uncontrolled environment.

8) The mapping relationship between a CG resource usage mode and the first environment may include: one CG resource usage mode corresponding to the controlled environment, at least one of CG resource usage modes corresponding to the partially-controlled environment, and multiple CG resource usage modes corresponding to the uncontrolled environment.

Optionally, the different levels of the first environment (two levels: controlled and uncontrolled environments; or, three levels: controlled, uncontrolled and partially-controlled environments) may be mapped to different CG resource usage modes. The mapping may be pre-configured, or indicated by the network device, or determined by the UE (further indicated to the network device).

In 302, the terminal device determines a corresponding first environment according to the first environment indication information.

Determining, by the terminal device, a corresponding first environment according to the first environment indication information may include: according to the first environment indication information, determining, by the terminal device, the first environment in which the terminal device is located at a current time, in a historical time period or a subsequent time period.

In 303, the terminal device determines at least one of the CG resource usage mode, the CG resource configuration mode, or the CG resource configuration parameter according to the first environment. It is understood that step 303 is an optional step. Optionally, if the first environment is different, a corresponding CG resource usage mode is different, or a configuration mode is different, or a configuration parameter is different.

In 304, the terminal device uses a CG resource for transmission according to at least one of the CG resource use mode, the CG resource configuration mode, and the CG resource configuration parameter.

It is noted that for details of step 304 in the embodiment, reference may be made to previous description of step 203 in the embodiment shown in FIG. 2 and repeated descriptions will be omitted here.

In the embodiments of the present disclosure, methods for determining the environment in which the terminal device is located are given, ensuring a consistent understanding between the terminal device and the network device, and clarifying the behavior of the terminal device.

Corresponding to at least one of the above method embodiments applied to a terminal device, embodiments of the present disclosure further provide one or more terminal devices. The terminal device of embodiments of the present disclosure may implement any one of the above method embodiments. FIG. 4A is a schematic diagram of a terminal device according to another embodiment of the present disclosure. The terminal device may include a processing module 401.

The processing module 401 is configured to, according to a first environment and/or Configured Grant (CG) resource configuration information, determine at least one of a CG resource usage mode, a CG resource configuration mode or a CG resource configuration parameter, wherein the first environment is determined by the terminal device according to first environment indication information sent by a network device, and the CG resource configuration information is sent by the network device.

Figure 4B:
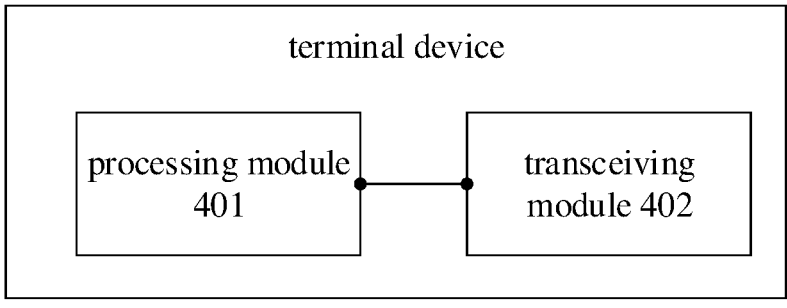
FIG. 4B is a schematic diagram of a terminal device according to another embodiment of the present disclosure.

Optionally, as shown in FIG. 4B which is a schematic diagram of a terminal device according to another embodiment of the present disclosure, the terminal device may further includes a transceiving module 402.

The transceiving module 402 is configured to receive first environment indication information and/or the CG resource configuration information sent by the network device.

Optionally, the processing module 401 is further configured to: determine a corresponding first environment according to the first environment indication information.

Optionally, the processing module 401 is configured to: according to the first environment indication information, determine the first environment in which the terminal device is located at a current time, in a historical time period or a subsequent time period.

Optionally, the processing module 401 is further configured to perform at least one of the following:

performing transmission using a CG resource according to the CG resource usage mode;

performing transmission using the CG resource according to the CG resource configuration mode; and performing transmission using the CG resource according to the CG resource configuration parameter.

Optionally, the processing module 401 is further configured to performing one of the following:

selecting first CG resource configuration information/CG resource usage mode according to at least one of the multiple pieces of CG resource configuration information, a current interference situation, and the first environment; or selecting the first CG resource configuration information/CG resource usage mode according to particular indication information sent by the network device.

Optionally, the transceiving module 402 is configured to report to the network device the selected first CG resource configuration information/CG resource usage mode.

Figure 5:
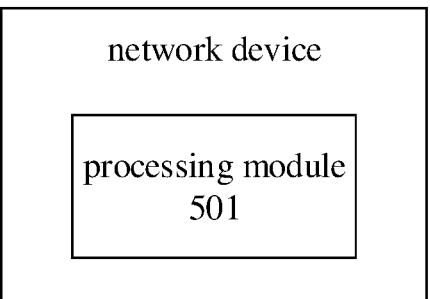
FIG. 5 is a schematic diagram of a network device according to another embodiment of the present disclosure.

Corresponding to at least one of the above method embodiments applied to a network device, embodiments of the present disclosure further provide one or more network devices. The network device of embodiments of the present disclosure may implement any one of the above method embodiments. FIG. 5 is a schematic diagram of a network device according to an embodiment of the present disclosure. The network device may include a transceiving module 501.

The transceiving module 501 is configured to send first environment indication information and/or Configured Grant (CG) resource configuration information to a terminal device, wherein the first environment indication information is used for the terminal device to determine a corresponding first environment, and the first environment and/or the CG resource configuration information is used for the terminal device to determine at least one of a CG resource usage mode, a CG resource configuration mode or a CG resource configuration parameter.

Optionally, the transceiving module 501 is further configured to receive the selected first CG resource configuration information/CG resource usage mode reported by the terminal device.

Figure 6:
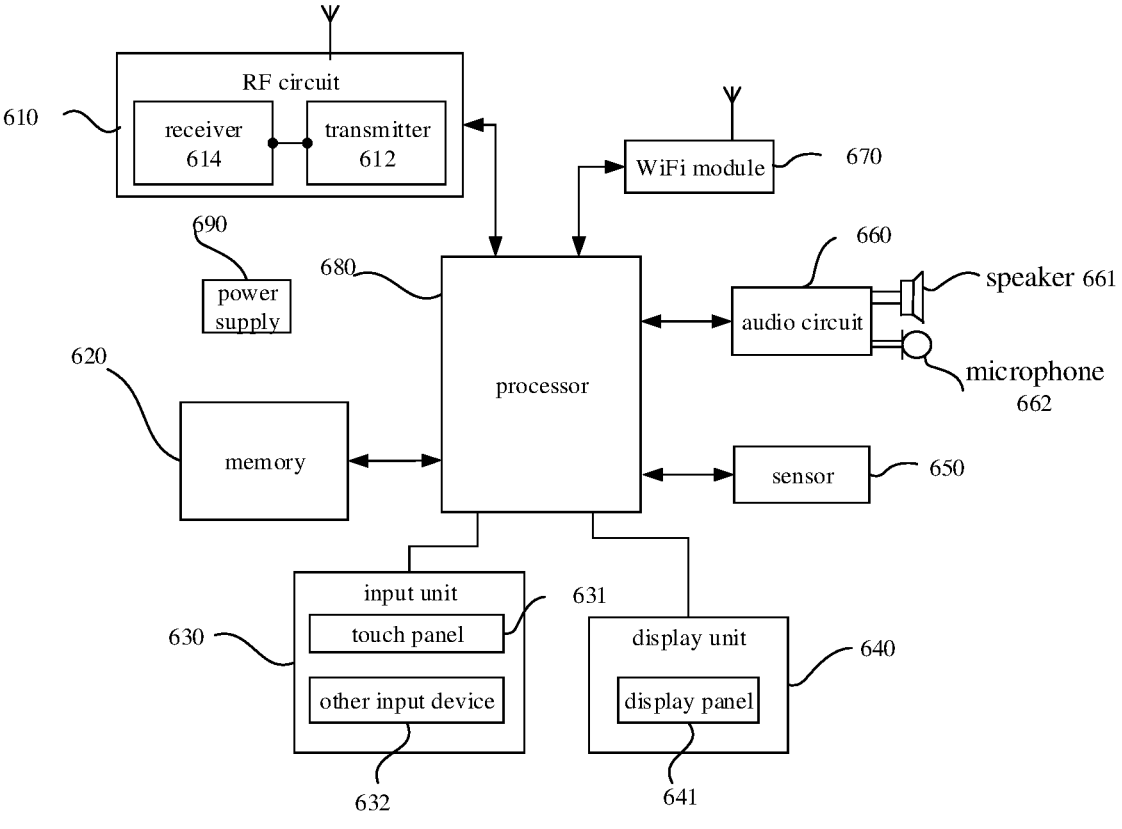
FIG. 6 is a schematic diagram of a terminal device according to another embodiment of the present disclosure.

Corresponding to at least one of the above method embodiments applied to a terminal device, embodiments of the present disclosure further provide one or more terminal devices. The terminal device of embodiments of the present disclosure may implement any one of the above method embodiments. FIG. 6 is a schematic diagram of a terminal device according to another embodiment of the present disclosure. Description is made below with an example where the terminal device is a cell phone. The terminal device may include: a Radio Frequency (RF) circuit 610, a memory 620, an input unit 630, a display unit 640, a sensor 650, an audio circuit 660, a Wireless Fidelity (WiFi) module 670, a processor 680, and a power supply 690 and other components. In particular, the RF circuit 610 includes a receiver 614 and a transmitter 612. It will be understood by those skilled in the art that the structure of the cell phone illustrated in FIG. 6 does not constitute a limitation of the cell phone and the cell phone may include more or fewer components than illustrated, or a combination of certain components, or a different arrangement of components.

The following is a detailed description of the various constituent parts of the cell phone in connection with FIG. 6.

The RF circuit 610 may be used for reception and transmission of signals during sending and receiving messages or calls. In particular, after receiving downlink information from a base station, the received information is delivered to the processor 680 for processing. In addition, data involved in uplink is sent to the base station. Typically, the RF circuit 610 includes, but is not limited to, an antenna, at least one amplifier, a transceiver, a coupler, a low noise amplifier (LNA), a duplexer, etc. In addition, the RF circuit 610 may also communicate with networks and other devices via wireless communication. The above wireless communication may use any communication standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), e-mail, short messaging service (SMS) and so on.

The memory 620 may be used to store software programs and modules, and the processor 680 performs various functional applications and data processing of the cell phone by running the software programs and modules stored in the memory 620. The memory 620 may primarily include a memory program area and a memory data area. The memory program area may store an operating system, applications required for at least one function (e.g., sound play function, image play function, etc.), and so on. The memory data area may store data created based on the use of the cell phone (e.g., audio data, phone book, etc.), and so on. In addition, the memory 620 may include high-speed random access memory and may also include non-volatile memory, such as at least one disk memory device, flash memory device, or other volatile solid state memory device.

The input unit 630 may be used to receive input numeric or character information, as well as to generate key signal inputs related to user settings and control of functions of the cell phone. Specifically, the input unit 630 may include a touch panel 631 as well as other input devices 632. The touch panel 631, also referred to as a touch screen, may collect user touch operations on or near it (e.g., user operations on or near touch panel 631 using any suitable object or attachment such as a finger, stylus, etc.) and drive a corresponding connected device according to a predetermined program. Optionally, the touch panel 631 may include two parts: a touch detection device and a touch controller. The touch detection device detects the user's touch orientation and detects a signal brought by the touch operation and sends the signal to the touch controller. The touch controller receives the touch information from the touch detection device and converts it into contact coordinates and sends them to the processor 680, and can receive commands from the processor 680 and execute them. In addition, various types of touch manner such as resistive, capacitive, infrared, and surface acoustic wave may be used to implement the touch panel 631. In addition to the touch panel 631, the input unit 630 may further include other input devices 632. Specifically, the other input devices 632 may include, but are not limited to one of more of: a physical keyboard, function keys (such as volume control buttons, switch buttons, etc.), a trackball, a mouse, a joystick, etc.

The display unit 640 may be used to display information entered by or provided to the user and various menus of the cell phone. The display unit 640 may include a display panel 641. Optionally, the display panel 641 may be configured in the form of Liquid Crystal Display (LCD), Organic Light-Emitting Diode (OLED), etc. Further, the touch panel 631 may cover the display panel 641, and when touch panel 631 detects a touch operation on or near it, the detected touch operation is transmitted to processor 680 to determine the type of touch event. Subsequently, the processor 680 provides a corresponding visual output on display panel 641 based on the type of touch event. Although in FIG. 6, the touch panel 631 and the display panel 641 are used as two separate components to implement the input and input functions of the cell phone, in some embodiments, the input and output functions of the phone may be implemented by integrating the touch panel 631 with the display panel 641.

The cell phone may further include at least one sensor 650, such as a light sensor, a motion sensor, and other sensors. Specifically, the light sensor may include an ambient light sensor and a proximity sensor. The ambient light sensor may adjust the brightness of the display panel 641 based on the brightness of the ambient light. The proximity sensor may turn off the display panel 641 and/or the backlight when the cell phone is moved to the ear. As a kind of motion sensor, an accelerometer sensor may detect the magnitude of acceleration in all directions (generally three axes) and the magnitude and direction of gravity when stationary, which may be used for applications that identify the phone's posture (such as horizontal and vertical screen switching, related games, magnetometer posture calibration), vibration recognition-related functions (such as pedometer, tapping), etc. The cell phone may also be configured with other sensors like gyroscope, barometer, hygrometer, thermometer, infrared sensor, etc., and details of them are omitted here.

The audio circuit 660, the speaker 661, and the microphone 662 may provide an audio interface between the user and the cell phone. The audio circuit 660 may convert the received audio data into electrical signals and transmit the electrical signals to the speaker 661. The speaker 661 converts the received electrical signals into sound signals to be output by the speaker 661. On the other hand, the microphone 662 converts the collected sound signals into electrical signals, which are received by the audio circuit 660 and converted into audio data, and then the audio data output processor 680 is processed and sent to, for example, another mobile phone by the RF circuit 610, or the audio data is output to the memory 620 for further processing.

WiFi is a short-range wireless transmission technology, and the cell phone may help users send and receive e-mails, browse the Web, and access streaming media, and so on through the WiFi module 670. The WiFi module 670 provides wireless broadband Internet access to users. Although the WiFi module 670 is illustrated in FIG. 6, it is understood that the WiFi module 670 is not a mandatory component of the cell phone and may be omitted entirely as needed to the extent that such omission does not change the essence of the present disclosure.

The processor 680 is the control center of the cell phone and is connected to various parts of the entire cell phone using various interfaces and lines to perform various functions and process data of the cell phone by running or executing software programs and/or modules stored in the memory 620, as well as calling data stored in the memory 620, thereby providing overall monitoring of the cell phone. Optionally, the processor 680 may include one or more processing units; for example, the processor 680 may be integrated with an application processor and a modem processor. The application processor primarily handles the operating system, user interface and applications, etc., and the modem processor primarily handles wireless communications. It will be appreciated that the above modem processor may also not be integrated into the processor 680.

The cell phone also includes the power supply 690 (e.g., a battery) to power the various components, and for example, the power supply may be logically connected to the processor 680 through a power management system, thereby enabling functions such as managing charging, discharging, and power consumption management through the power management system. Although not shown, the cell phone may also include a camera, a Bluetooth module, etc., details of which will be omitted here.

It should be noted that in some embodiments of the present disclosure, the processor 680 is configured to: according to a first environment and/or Configured Grant (CG) resource configuration information, determine at least one of a CG resource usage mode, a CG resource configuration mode or a CG resource configuration parameter, wherein the first environment is determined by the terminal device according to first environment indication information sent by a network device, and the CG resource configuration information is sent by the network device.

Optionally, the CG resource configuration information includes at least one of:

one or multiple pieces of CG resource configuration information;
   indication information for the CG resource usage mode;
   indication information for the CG resource configuration mode; or,
   the CG resource configuration parameter.

Optionally, the indication information for the CG resource usage mode includes:

indication information for a CG resource usage mode corresponding to Ultra-Reliable and Low-Latency Communication (URLLC); or, indication information for a CG resource usage mode corresponding to New Radio Unlicensed (NRU).

Optionally, the indication information for the CG resource usage mode or configuration mode corresponding to the URLLC includes:

indication information for the CG resource usage mode or configuration mode corresponding to legacy URLLC; or, indication information for the CG resource usage mode or configuration mode corresponding to enhanced URLLC;

the indication information for the CG resource usage mode or configuration mode corresponding to the NRU includes:

indication information for the CG resource usage mode or configuration mode corresponding to legacy NRU; or, indication information for the CG resource usage mode or configuration mode corresponding to enhanced NRU.

Optionally, the CG resource usage mode or configuration mode includes:

a CG resource usage mode or configuration mode corresponding to URLLC; or, a CG resource usage mode or configuration mode corresponding to NR-U.

Optionally, the CG resource usage mode or configuration mode corresponding to the URLLC includes:

a CG resource usage mode or configuration mode corresponding to legacy URLLC; or, an enhanced CG resource usage mode or configuration mode corresponding to enhanced URLLC;

the CG resource usage mode or configuration mode corresponding to NRU includes:

a CG resource usage mode or configuration mode corresponding to legacy NRU; or, an enhanced CG resource usage mode or configuration mode corresponding to enhanced NRU.

Optionally, the RF circuit 610 is configured to receive first environment indication information and/or the CG resource configuration information sent by the network device.

Optionally, the processor 680 is further configured to: determine a corresponding first environment according to the first environment indication information.

Optionally, the first environment is a controlled environment when the first environment indication information is indication information for the controlled environment; or the first environment is an uncontrolled environment when the first environment indication information is indication information for the uncontrolled environment.

Optionally, the first environment is a partially-controlled environment when the first environment indication information is indication information for the partially-controlled environment.

Optionally, the first environment indication information includes condition information for determining the first environment, and the condition information for determining the first environment includes at least one of:

a mapping relationship between a time period and the first environment;

a correspondence relationship between Listen Before Talk (LBT) and the first environment;

a mapping relationship between detection of a Wireless Fidelity (WiFi) signal and the first environment;

a mapping relationship between a CG configuration and the first environment;

a mapping relationship between a CG resource configuration parameter and the first environment;

a mapping relationship between a channel quality and the first environment;

a mapping relationship between an interference level and the first environment;

a mapping relationship between an amount of interference and the first environment; and a mapping relationship between a CG resource usage mode and the first environment.

Optionally, the mapping relationship between the time period and the first environment includes:

a first time period corresponding to a controlled environment and a second time period corresponding to an uncontrolled environment;

wherein the correspondence relationship between LBT and the first environment includes:

a LBT success corresponding to the controlled environment and a LBT failure corresponding to the uncontrolled environment; or, a case where a number of LBT failures within a first preset duration less than a first preset threshold corresponding to the controlled environment, and a case where the number of LBT failures within the first preset duration greater than or equal to the first preset threshold corresponding to the uncontrolled environment; or a case where a number of LBT successes within a second preset duration greater than or equal to a second preset threshold corresponding to the controlled environment, and a case where the number of LBT successes within the second preset duration less than the second preset threshold corresponding to the uncontrolled environment;

wherein the mapping relationship between detection of the WiFi signal and the first environment includes:

a case where no WiFi signal is detected corresponding to the controlled environment, and a case where the WiFi signal is detected corresponding to the uncontrolled environment;

wherein the mapping relationship between a CG configuration and the first environment includes:

one CG configuration corresponding to the controlled environment, and multiple CG configurations corresponding to the uncontrolled environment;

wherein the mapping relationship between a CG resource configuration parameter and the first environment includes:

inclusion of a particular CG resource configuration parameter corresponding to the controlled environment, and no inclusion of the particular CG resource configuration parameter corresponding to the uncontrolled environment; or no inclusion of the particular CG resource configuration parameter corresponding to the controlled environment, and inclusion of the particular CG resource configuration parameter corresponding to the uncontrolled environment;

wherein the mapping relationship between the channel quality and the first environment includes:

the channel quality greater than a first quality threshold corresponding to the controlled environment, and the channel quality less than or equal to the first quality threshold corresponding to the uncontrolled environment;

wherein the mapping relationship between an interference level and the first environment includes:

a low interference level corresponding to the controlled environment, and a high interference level corresponding to the uncontrolled environment;

wherein the mapping relationship between an amount of interference and the first environment includes:

an amount of interference less than a first interference threshold corresponding to the controlled environment, and an amount of interference greater than or equal to the first interference threshold corresponding to the uncontrolled environment;

wherein the mapping relationship between a CG resource usage mode and the first environment includes:

one CG resource usage mode corresponding to the controlled environment, and multiple CG resource usage modes corresponding to the uncontrolled environment; or, support for a particular CG usage mode corresponding to the controlled environment, and not support for the particular CG usage mode corresponding to the uncontrolled environment.

Optionally, the mapping relationship between the time period and the first environment includes:

a third time period corresponding to a controlled environment, a fourth time period corresponding to a partially-controlled environment and a fifth time period corresponding to an uncontrolled environment;

wherein the correspondence relationship between LBT and the first environment includes:

a case where a number of LBT failures within a first preset duration less than a third preset threshold corresponding to the controlled environment, a case where the number of LBT failures within the first preset duration greater than or equal to the third preset threshold and less than a fourth preset threshold corresponding to the partially-controlled environment, and a case where the number of LBT failures within the first preset duration greater than or equal to the fourth preset threshold corresponding to the uncontrolled environment; or a case where a number of LBT successes within a second preset duration greater than or equal to a fifth preset threshold corresponding to the controlled environment, a case where the number of LBT successes within the second preset duration less than the fifth preset threshold and greater than or equal to a sixth preset threshold corresponding to the partially-controlled environment, and a case where the number of LBT successes within the second preset duration less than the sixth preset threshold corresponding to the uncontrolled environment;

wherein the mapping relationship between detection of the WiFi signal and the first environment includes:

a case where no WiFi signal is detected in a first time period corresponding to the controlled environment, a case where no WiFi signal is detected in a part of the first time period and the WiFi signal is detected in another part of the first time period corresponding to the partially-controlled environment, and a case where the WiFi signal is detected in the first time period corresponding to the uncontrolled environment; or a case where no WiFi signal is detected in a first frequency band corresponding to the controlled environment, a case where no WiFi signal is detected in a part of the first frequency band and the WiFi signal is detected in another part of the first frequency band corresponding to the partially-controlled environment, and a case where the WiFi signal is detected in the first frequency band corresponding to the uncontrolled environment;

wherein the mapping relationship between a CG configuration and the first environment includes:

one CG configuration corresponding to the controlled environment, at least one of CG configurations corresponding to the partially-controlled environment, and multiple CG configurations corresponding to the uncontrolled environment;

wherein the mapping relationship between the channel quality and the first environment includes:

the channel quality greater than a second quality threshold corresponding to the controlled environment, the channel quality less than or equal to the second quality threshold and greater than a third quality threshold corresponding to the partially-controlled environment, and the channel quality less than or equal to the third quality threshold corresponding to the uncontrolled environment;

wherein the mapping relationship between an interference level and the first environment includes:

a low interference level corresponding to the controlled environment, a middle interference level corresponding to the partially-controlled environment, and a high interference level corresponding to the uncontrolled environment;

wherein the mapping relationship between an amount of interference and the first environment includes:

an amount of interference less than a second interference threshold corresponding to the controlled environment, an amount of interference greater than or equal to the second interference threshold and less than a third interference threshold corresponding to the partially-controlled environment, and an amount of interference greater than or equal to the third interference threshold corresponding to the uncontrolled environment;

wherein the mapping relationship between a CG resource usage mode and the first environment includes:

one CG resource usage mode corresponding to the controlled environment, at least one of CG resource usage modes corresponding to the partially-controlled environment, and multiple CG resource usage modes corresponding to the uncontrolled environment.

Optionally, the processor 680 is configured to: according to the first environment indication information, determine the first environment in which the terminal device is located at a current time, in a historical time period or a subsequent time period.

Optionally, when the first environment is different, a corresponding CG resource usage mode or configuration mode or configuration parameter is different.

Optionally, the processor 680 is further configured to perform at least one of the following:

performing, by the terminal device, transmission using a CG resource according to the CG resource usage mode;

performing, by the terminal device, transmission using the CG resource according to the CG resource configuration mode; and performing, by the terminal device, transmission using the CG resource according to the CG resource configuration parameter.

Optionally, the processor 680 is further configured to perform at least one of:

the CG resource configuration information including configuration information of a timer, and starting or not starting the timer;

obtaining a Hybrid Automatic Repeat Request (HARQ) process using a HARQ process formula calculation, or using a UE determination or self-selection method;

performing autonomous transmission corresponding to URLLC or autonomous retransmission corresponding to NRU for the HARQ process, or for deprioritized Media Access Control Protocol Data Unit (MAC PDU)/a deprioritized resource;

when performing transmission or autonomous transmission for the HARQ process, or for the deprioritized MAC PDU/the deprioritized resource, not setting or modifying a pending state of the HARQ process and/or not restarting or starting the timer;

when performing transmission or autonomous retransmission for the deprioritized MAC PDU/the deprioritized resource or for the HARQ process, setting a pending state;

transmitting the deprioritized MAC PDU/the deprioritized resource or the HARQ process in the pending state, and starting or not starting the timer;

autonomously transmitting data of the HARQ process;

an offset of the HARQ process being configured;

an offset2 of the HARQ process being configured;

when transmitting the CG resource or transmits data of the HARQ process, not carrying Uplink Control Information (UCI);

when performing transmission for the HARQ process, carrying the UCI, wherein the UCI includes at least the HARQ process;

not receiving or expecting to receive Downlink Feedback Information (DFI);

receiving the DFI, and ignoring the DFI;

receiving the DFI, and performing a corresponding operation in accordance with the DFI;

supporting or using a transmission mode across a slot boundary;

using a Type-B PUSCH resource configuration or transmission mode;

packetizing MAC PDUs for each resource in conflict;

indicating each of the packetized MAC PDUs to a physical layer; and indicating a triggered Scheduling Request (SR) and the packetized MAC PDUs to the physical layer.

Optionally, offsets of HARQ processes for different CG resources are the same or different, and/or, offset2s of the HARQ processes are different.

Optionally, the processor 680 is further configured to perform at least one of the following:

the CG resource configuration information not including configuration information of a first timer, and not starting or not maintaining the first timer;

obtaining a first HARQ process using a HARQ process formula calculation;

performing autonomous transmission for the first HARQ process, or performing autonomous transmission for the first HARQ process using a first transmission mechanism;

the offset2 of the first HARQ process being configured; and when transmitting a CG resource or transmitting data of the first HARQ process, not carrying a first UCI.

Optionally, the processor 680 is further configured to perform at least one of:

not receiving or not expecting to receive a first DFI;

receiving the first DFI, and ignoring the first DFI;

receiving the first DFI, and performing a corresponding operation according to the first DFI;

packetizing MAC PDUs for each resource in conflict;

indicating the packetized MAC PDUs to a physical layer; and indicating a triggered SR and the packetized MAC PDUs to the physical layer.

Optionally, the processor 680 is further configured to perform at least one of:

the CG resource configuration information not including configuration information of a second timer, and not starting or not maintaining the second timer;

obtaining a second HARQ process using a UE determination or self-selection mode;

performing autonomous transmission for the second HARQ process, or performing autonomous retransmission for the second HARQ process using a second transmission mechanism;

the offset of the second HARQ process being configured, or the offset2 of the second HARQ process being configured;

when transmitting a CG resource or transmitting data of the second HARQ process, carrying a second UCI, wherein the second UCI includes at least the second HARQ process;

not receiving or not expecting to receive a second DFI;

receiving the second DFI, and ignoring the second DFI;

receiving the second DFI, and performing a corresponding operation according to the second DFI;

supporting or using a transmission mode across a slot boundary;

packetizing MAC PDUs for each resource in conflict;

indicating the packetized MAC PDUs to a physical layer; and indicating a triggered SR and the packetized MAC PDUs to the physical layer.

Optionally, the processor 680 is further configured to perform at least one of:

the CG resource configuration information including configuration information of a third timer, and not starting or not maintaining the third timer;

obtaining a third HARQ process using a UE determination or self-selection mode;

performing autonomous transmission/retransmission for the third HARQ process, or performing autonomous transmission/retransmission for the third HARQ process using a first transmission mechanism;

when performing transmission or autonomous transmission for the deprioritized MAC PDU/the deprioritized resource or for the third HARQ process, not setting or modifying a pending state of the third HARQ process and/or not restarting or starting the timer;

the offset of the third HARQ process being configured, or the offset2 of the third HARQ process being configured;

when transmitting a CG resource or transmitting data of the third HARQ process, carrying a third UCI, wherein the third UCI includes at least the third HARQ process;

not receiving or not expecting to receive a third DFI;

receiving the third DFI, and ignoring the third DFI;

receiving the third DFI, and performing a corresponding operation according to the third DFI;

supporting or using a transmission mode across a slot boundary;

packetizing MAC PDUs for each resource in conflict;

indicating the packetized MAC PDUs to a physical layer; and indicating a triggered SR and the packetized MAC PDUs to the physical layer.

Optionally, the processor 680 is further configured to perform at least one of:

the CG resource configuration information including configuration information of a fourth timer, and not starting or not maintaining the fourth timer;

obtaining a fourth HARQ process using a UE determination or self-selection mode;

performing autonomous retransmission for the fourth HARQ process, or performing autonomous retransmission for the fourth HARQ process using a second transmission mechanism;

setting a pending state for the deprioritized MAC PDU/ the deprioritized resource or for the HARQ process;

transmitting the deprioritized MAC PDU/the deprioritized resource or the HARQ process in the pending state, and starting or not starting the timer;

the offset of the fourth HARQ process being configured, or the offset2 of the fourth HARQ process being configured;

when transmitting a CG resource or transmitting data of the fourth HARQ process, carrying a fourth UCI, wherein the fourth UCI includes at least the fourth HARQ process;

not receiving or not expecting to receive a fourth DFI;

receiving the fourth DFI and ignoring the fourth DFI;

receiving the fourth DFI and performing a corresponding operation according to the fourth DFI;

supporting or using a transmission mode across a slot boundary;

packetizing MAC PDUs for each resource in conflict;

indicating the packetized MAC PDUs to a physical layer; and indicating a triggered SR and the packetized MAC PDUs to the physical layer.

Optionally, the processor 680 is further configured to perform at least one of:

the CG resource configuration information including configuration information of a fifth timer, and not starting or not maintaining the fifth timer; or the terminal device starting or maintaining the fifth timer;

obtaining a fifth HARQ process using a HARQ process formula calculation or a UE determination or self-selection mode;

performing autonomous retransmission for the fifth HARQ process, or performing autonomous retransmission for the fifth HARQ process using a second transmission mechanism;

setting a pending state for the deprioritized MAC PDU/ the deprioritized resource or for the HARQ process;

transmitting the deprioritized MAC PDU/the deprioritized resource or the HARQ process in the pending state, and starting or not starting the timer;

the offset of the fifth HARQ process being configured, or the offset2 of the fifth HARQ process being configured;

when transmitting a CG resource or transmitting data of the fifth HARQ process, carrying a fifth UCI, wherein the fifth UCI includes at least the fourth HARQ process;

not receiving or not expecting to receive a fifth DFI;

receiving the fifth DFI, and ignoring the fifth DFI;

receiving the fifth DFI, and performing a corresponding operation according to the fifth DFI;

supporting or using, a transmission mode across a slot boundary;

packetizing MAC PDUs for each resource in conflict;

indicating the packetized MAC PDUs to a physical layer; and indicating a triggered SR and the packetized MAC PDUs to the physical layer.

Optionally, the CG resource configuration information further includes CG resource configuration information corresponding to at least one different service.

Optionally, the CG resource configuration information corresponding to at least one different service includes CG resource configuration information corresponding to at least one of: an enhanced Mobile Broadband (eMBB) service, a Vehicle to X (V2X) service, a Time-Sensitive Communication (TSC) service, a URLLC service, and a massive Machine Type of Communication (mMTC) service.

Optionally, when the CG resource configuration information includes multiple pieces of CG resource configuration information, wherein the processor 680 is further configured to perform one of the following:

selecting first CG resource configuration information/CG resource usage mode according to at least one of the multiple pieces of CG resource configuration information, a current interference situation, and the first environment; or selecting the first CG resource configuration information/ CG resource usage mode according to particular indication information sent by the network device.

Optionally, the RF circuit 610 is further configured to: report to the network device the selected first CG resource configuration information/CG resource usage mode.

Optionally, the first environment is a controlled environment, a partially-controlled environment, or a time period without interference in the partially-controlled environment.

Optionally, the first environment is an uncontrolled environment, a partially-controlled environment, or a time period in which there is interference in the partially-controlled environment. uncontrolled environment, or a partially-controlled environment.

Figure 7:
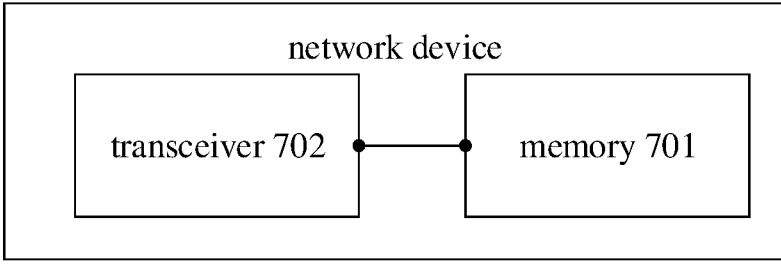
FIG. 7 is a schematic diagram of a network device according to another embodiment of the present disclosure.

Corresponding to at least one of the above method embodiments applied to a network device, embodiments of the present disclosure further provide one or more network devices. The network device of embodiments of the present disclosure may implement any one of the above method embodiments. FIG. 7 is a schematic diagram of a network device according to another embodiment of the present disclosure. As shown in FIG. 7, the network device may include a memory 701 and a transceiver 702. The memory 701 may be used for storing executable program codes.

The transceiver 702 is configured to send first environment indication information and/or Configured Grant (CG) resource configuration information to a terminal device, wherein the first environment indication information is used for the terminal device to determine a corresponding first environment, and the first environment and/or the CG resource configuration information is used for the terminal device to determine at least one of a CG resource usage mode, a CG resource configuration mode or a CG resource configuration parameter.

Optionally, the CG resource configuration information includes at least one of:

one or multiple pieces of CG resource configuration information;

indication information for the CG resource usage mode;

indication information for the CG resource configuration mode; or, the CG resource configuration parameter.

Optionally, the indication information for the CG resource usage mode includes:

indication information for a CG resource usage mode corresponding to Ultra-Reliable and Low-Latency Communication (URLLC); or, indication information for a CG resource usage mode corresponding to New Radio Unlicensed (NRU).

Optionally, the indication information for the CG resource usage mode or configuration mode corresponding to the URLLC includes:

indication information for the CG resource usage mode or configuration mode corresponding to legacy URLLC; or, indication information for the CG resource usage mode or configuration mode corresponding to enhanced URLLC;

the indication information for the CG resource usage mode or configuration mode corresponding to the NRU includes:

indication information for the CG resource usage mode or configuration mode corresponding to legacy NRU; or, indication information for CG resource usage mode or configuration mode corresponding to enhanced NRU.

Optionally, the CG resource usage mode or configuration mode includes:

a CG resource usage mode or configuration mode corresponding to URLLC; or, a CG resource usage mode or configuration mode corresponding to NR-U.

Optionally, the CG resource usage mode or configuration mode corresponding to the URLLC includes:

a CG resource usage mode or configuration mode corresponding to legacy URLLC; or, an enhanced CG resource usage mode or configuration mode corresponding to enhanced URLLC;

the CG resource usage mode or configuration mode corresponding to NRU includes:

a CG resource usage mode or configuration mode corresponding to legacy NRU; or, an enhanced CG resource usage mode or configuration mode corresponding to enhanced NRU.

Optionally, the first environment is a controlled environment when the first environment indication information is indication information for the controlled environment; or the first environment is an uncontrolled environment when the first environment indication information is indication information for the uncontrolled environment.

Optionally, the first environment is a partially-controlled environment when the first environment indication information is indication information for the partially-controlled environment.

Optionally, the first environment indication information includes condition information for determining the first environment, and the condition information for determining the first environment includes at least one of:

a mapping relationship between a time period and the first environment;

a correspondence relationship between Listen Before Talk (LBT) and the first environment;

a mapping relationship between detection of a Wireless Fidelity (WiFi) signal and the first environment;

a mapping relationship between a CG configuration and the first environment;

a mapping relationship between a CG resource configuration parameter and the first environment;

a mapping relationship between a channel quality and the first environment;

a mapping relationship between an interference level and the first environment;

a mapping relationship between an amount of interference and the first environment; and a mapping relationship between a CG resource usage mode and the first environment.

Optionally, the mapping relationship between the time period and the first environment includes:

a first time period corresponding to a controlled environment and a second time period corresponding to an uncontrolled environment;

wherein the correspondence relationship between LBT and the first environment includes:

a LBT success corresponding to the controlled environment and a LBT failure corresponding to the uncontrolled environment; or, a case where a number of LBT failures within a first preset duration less than a first preset threshold corresponding to the controlled environment, and a case where the number of LBT failures within the first preset duration greater than or equal to the first preset threshold corresponding to the uncontrolled environment; or a case where a number of LBT successes within a second preset duration greater than or equal to a second preset threshold corresponding to the controlled environment, and a case where the number of LBT successes within the second preset duration less than the second preset threshold corresponding to the uncontrolled environment;

wherein the mapping relationship between detection of the WiFi signal and the first environment includes:

a case where no WiFi signal is detected corresponding to the controlled environment, and a case where the WiFi signal is detected corresponding to the uncontrolled environment;

wherein the mapping relationship between a CG configuration and the first environment includes:

one CG configuration corresponding to the controlled environment, and multiple CG configurations corresponding to the uncontrolled environment;

wherein the mapping relationship between a CG resource configuration parameter and the first environment includes:

inclusion of a particular CG resource configuration parameter corresponding to the controlled environment, and no inclusion of the particular CG resource configuration parameter corresponding to the uncontrolled environment; or no inclusion of the particular CG resource configuration parameter corresponding to the controlled environment, and inclusion of the particular CG resource configuration parameter corresponding to the uncontrolled environment;

wherein the mapping relationship between the channel quality and the first environment includes:

the channel quality greater than a first quality threshold corresponding to the controlled environment, and the channel quality less than or equal to the first quality threshold corresponding to the uncontrolled environment;

wherein the mapping relationship between an interference level and the first environment includes:

a low interference level corresponding to the controlled environment, and a high interference level corresponding to the uncontrolled environment;

wherein the mapping relationship between an amount of interference and the first environment includes:

an amount of interference less than a first interference threshold corresponding to the controlled environment, and an amount of interference greater than or equal to the first interference threshold corresponding to the uncontrolled environment;

wherein the mapping relationship between a CG resource usage mode and the first environment includes:

one CG resource usage mode corresponding to the controlled environment, and multiple CG resource usage modes corresponding to the uncontrolled environment; or, support for a particular CG usage mode corresponding to the controlled environment, and not support for the particular CG usage mode corresponding to the uncontrolled environment.

Optionally, the mapping relationship between the time period and the first environment includes:

a third time period corresponding to a controlled environment, a fourth time period corresponding to a partially-controlled environment and a fifth time period corresponding to an uncontrolled environment;

wherein the correspondence relationship between LBT and the first environment includes:

a case where a number of LBT failures within a first preset duration less than a third preset threshold corresponding to the controlled environment, a case where the number of LBT failures within the first preset duration greater than or equal to the third preset threshold and less than a fourth preset threshold corresponding to the partially-controlled environment, and a case where the number of LBT failures within the first preset duration greater than or equal to the fourth preset threshold corresponding to the uncontrolled environment; or a case where a number of LBT successes within a second preset duration greater than or equal to a fifth preset threshold corresponding to the controlled environment, a case where the number of LBT successes within the second preset duration less than the fifth preset threshold and greater than or equal to a sixth preset threshold corresponding to the partially-controlled environment, and a case where the number of LBT successes within the second preset duration less than the sixth preset threshold corresponding to the uncontrolled environment;

wherein the mapping relationship between detection of the WiFi signal and the first environment includes:

a case where no WiFi signal is detected in a first time period corresponding to the controlled environment, a case where no WiFi signal is detected in a part of the first time period and the WiFi signal is detected in another part of the first time period corresponding to the partially-controlled environment, and a case where the WiFi signal is detected in the first time period corresponding to the uncontrolled environment; or a case where no WiFi signal is detected in a first frequency band corresponding to the controlled environment, a case where no WiFi signal is detected in a part of the first frequency band and the WiFi signal is detected in another part of the first frequency band corresponding to the partially-controlled environment, and a case where the WiFi signal is detected in the first frequency band corresponding to the uncontrolled environment;

wherein the mapping relationship between a CG configuration and the first environment includes:

one CG configuration corresponding to the controlled environment, at least one of CG configurations corresponding to the partially-controlled environment, and multiple CG configurations corresponding to the uncontrolled environment;

wherein the mapping relationship between the channel quality and the first environment includes:

the channel quality greater than a second quality threshold corresponding to the controlled environment, the channel quality less than or equal to the second quality threshold and greater than a third quality threshold corresponding to the partially-controlled environment, and the channel quality less than or equal to the third quality threshold corresponding to the uncontrolled environment;

wherein the mapping relationship between an interference level and the first environment includes:

a low interference level corresponding to the controlled environment, a middle interference level corresponding to the partially-controlled environment, and a high interference level corresponding to the uncontrolled environment;

wherein the mapping relationship between an amount of interference and the first environment includes:

an amount of interference less than a second interference threshold corresponding to the controlled environment, an amount of interference greater than or equal to the second interference threshold and less than a third interference threshold corresponding to the partially-controlled environment, and an amount of interference greater than or equal to the third interference threshold corresponding to the uncontrolled environment;

wherein the mapping relationship between a CG resource usage mode and the first environment includes:

one CG resource usage mode corresponding to the controlled environment, at least one of CG resource usage modes corresponding to the partially-controlled environment, and multiple CG resource usage modes corresponding to the uncontrolled environment.

Optionally, when the first environment is different, a corresponding CG resource usage mode or configuration mode or configuration parameter is different.

Optionally, the CG resource configuration information further includes CG resource configuration information corresponding to at least one different service.

Optionally, the CG resource configuration information corresponding to at least one different service includes CG resource configuration information corresponding to at least one of: an enhanced Mobile Broadband (eMBB) service, a Vehicle to X (V2X) service, a Time-Sensitive Communication (TSC) service, a URLLC service, and a massive Machine Type of Communication (mMTC) service.

Optionally, the transceiver 702 is configured to receive the selected first CG resource configuration information/CG resource usage mode reported by the terminal device.

The functions described in the embodiments of the present disclosure may be implemented in whole or in part by software, hardware, firmware or any combination thereof in one or more of the above examples. When implemented in software, the functions may be implemented in whole or in part in the form of a computer program product which includes one or more computer instructions. When the computer program instructions are loaded and executed on a computer, the procedures or functions described in accordance with the embodiments of the present disclosure are generated in whole or in part. The computer is a general-purpose computer, a special-purpose computer, a computer network or other programmable devices. The computer instructions are stored in a computer readable storage medium, or transmitted from one computer readable storage medium to another. For example, the computer instructions are transmitted from one website, computer, server or data center to another website, computer, server or data center wiredly (e.g. a coaxial cable, a optical fiber, a Digital Subscriber Line (DSL)) or wirelessly (e.g. infrared, Wi-Fi, microwave etc.). The computer readable storage medium is any medium to which a computer can perform storage or a data storage device such as a server that includes one or more media, a data center. The media is a magnetic medium (e.g. a floppy disk, a hard disk, a magnetic tape), an optical medium (e.g. a Digital Video Disc (DVD)), or a semiconductor medium (e.g. a Solid State Disk (SSD)).

The terms "first", "second", "third", "fourth", etc. (if present) in the specification and claims of the present disclosure and in the accompanying drawings above are used to distinguish similar objects and do not necessarily describe a particular order or sequence. It should be understood that the data so used may be interchangeable where appropriate so that the embodiments described herein may be implemented in an order other than what is illustrated or described herein. In addition, the terms "include" and "have" and any variations thereof, are intended to cover non-exclusive inclusion, e.g., a process, method, system, product, or apparatus including a series of steps or units are not necessarily limited to those steps or units that are clearly listed, but may include other steps or units that are not clearly listed or are inherent to the process, method, product, or device.

What is claimed is:

1. A data communication method, comprising:
receiving, by a terminal device, Configured Grant (CG) resource configuration information sent by a network device, wherein:
a CG resource usage mode or configuration mode in the CG resource configuration information comprises: a CG resource usage mode or configuration mode corresponding to Ultra-Reliable and Low-Latency Communication (URLLC) for transmission of a URLLC service in a New Radio Unlicensed (NRU) system, or a CG resource usage mode or configuration mode corresponding to NRU for transmission of the URLLC service in the NRU system,
wherein the CG resource usage mode corresponding to the URLLC comprises: a CG resource usage mode or configuration mode corresponding to legacy URLLC, or a CG resource usage mode or configuration mode corresponding to enhanced URLLC;
according to the CG resource configuration information, determining, by the terminal device, a CG resource usage mode or configuration mode;
wherein the CG resource usage mode or configuration mode determined by the terminal device is: the CG resource usage mode or configuration mode corresponding to legacy URLLC;
wherein the CG resource usage mode or configuration mode corresponding to legacy URLLC comprises:
the CG resource configuration information not comprising configuration information of a CG retransmission cg-Retransmission Timer, and the terminal device being configured with a harq-ProcID-Offset2 of a first Hybrid Automatic Repeat Request (HARQ) process;
wherein the method further comprises:
obtaining, by the terminal device, the first HARQ process using a HARQ process formula calculation.

2. The method according to claim 1, wherein the CG resource configuration information further comprises:

one or multiple pieces of CG resource configuration information.

3. The method according to claim 1, wherein the CG resource configuration information comprises indication information for the CG resource usage mode, and the indication information for the CG resource usage mode comprises:
indication information for a CG resource usage mode corresponding to New Radio Unlicensed (NRU).

4. The method according to claim 1, further comprising at least one of the following:
performing, by the terminal device, transmission using a CG resource according to the CG resource usage mode; or
performing, by the terminal device, transmission using the CG resource according to the CG resource configuration mode.

5. The method according to claim 1, wherein offsets of HARQ processes for different CG resources are the same or different, or, offset2s of the HARQ processes are different, or
wherein offsets of HARQ processes for different CG resources are the same or different, and offset2s of the HARQ processes are different.

6. The method according to claim 1, further comprising:
in response to the terminal device transmitting a CG resource or transmitting data of the first HARQ process, not carrying a first Uplink Control Information (UCI).

7. A terminal device, comprising:
a processor; and
a memory storing instructions executable by the processor;
wherein when the instructions are executed by the processor, the terminal device is caused to:
receive Configured Grant (CG) resource configuration information sent by a network device, wherein:
a CG resource usage mode or configuration mode in the CG resource configuration information comprises: a CG resource usage mode or configuration mode corresponding to Ultra-Reliable and Low-Latency Communication (URLLC) for transmission of a URLLC service in a New Radio Unlicensed (NRU) system, or a CG resource usage mode or configuration mode corresponding to NRU for transmission of the URLLC service in the NRU system,
wherein the CG resource usage mode corresponding to the URLLC comprises: a CG resource usage mode or configuration mode corresponding to legacy URLLC, or a CG resource usage mode or configuration mode corresponding to enhanced URLLC;
according the CG resource configuration information, determine a CG resource usage mode or configuration mode;
wherein the CG resource usage mode or configuration mode determined by the terminal device is: the CG resource usage mode or configuration mode corresponding to legacy URLLC;
wherein the CG resource usage mode or configuration mode corresponding to legacy URLLC comprises:
the CG resource configuration information not comprising configuration information of a CG retransmission cg-Retransmission Timer, and the terminal device being configured with a harq-ProcID-Offset2 of a first Hybrid Automatic Repeat Request (HARQ) process;
wherein when the instructions are executed by the processor, the terminal device is further caused to:

obtain the first HARQ process using a HARQ process formula calculation.

8. The terminal device according to claim 7, wherein the CG resource configuration information further comprises:

one or multiple pieces of CG resource configuration information.

9. The terminal device according to claim 8, wherein the CG resource configuration information comprises indication information for the CG resource usage mode, and the indication information for the CG resource usage mode comprises:

indication information for a CG resource usage mode corresponding to New Radio Unlicensed (NRU).

10. The terminal device according to claim 7, wherein when the instructions are executed by the processor, the terminal device is caused to perform at least one of the following:

performing transmission using a CG resource according to the CG resource usage mode; or performing transmission using the CG resource according to the CG resource configuration mode.

11. The terminal device according to claim 7, wherein offsets of HARQ processes for different CG resources are the same or different, or offset2s of the HARQ processes are different; or wherein offsets of HARQ processes for different CG resources are the same or different, and offset2s of the HARQ processes are different.

12. The terminal device according to claim 7, wherein when the instructions are executed by the processor, the terminal device is caused to perform:

in response to the terminal device transmitting a CG resource or transmitting data of the first HARQ process, not carry a first Uplink Control Information (UCI).

13. A network device, comprising:

a processor; and a memory storing instructions executable by the processor;

wherein when the instructions are executed by the processor, the network device is caused to:

send Configured Grant (CG) resource configuration information to a terminal device, wherein the CG resource configuration information is used for the terminal device to determine a CG resource usage mode or configuration mode;

a CG resource usage mode or configuration mode in the CG resource configuration information comprises: a CG resource usage mode or configuration mode corresponding to Ultra-Reliable and Low-Latency Communication (URLLC) for transmission of a URLLC service in a New Radio Unlicensed (NRU) system, or a CG resource usage mode or configuration mode corresponding to NRU for transmission of the URLLC service in the NRU system, wherein the CG resource usage mode corresponding to the URLLC comprises: a CG resource usage mode or configuration mode corresponding to legacy URLLC, or a CG resource usage mode or configuration mode corresponding to enhanced URLLC;

wherein the CG resource usage mode or configuration mode determined by the terminal device is: the CG resource usage mode or configuration mode corresponding to legacy URLLC;

wherein the CG resource usage mode or configuration mode corresponding to legacy URLLC comprises:

the CG resource configuration information not comprising configuration information of a CG retransmission cg-Retransmission Timer, and the terminal device being configured with a harq-ProcID-Offset2 of a first Hybrid Automatic Repeat Request (HARQ) process, wherein the CG resource configuration information is used for the terminal device to obtain the first HARQ process using a HARQ process formula calculation.

14. The network device according to claim 13, wherein the CG resource configuration information comprises:

one or multiple pieces of CG resource configuration information.

* * * * *